United States Patent [19]

Robertson et al.

[11] Patent Number: 5,070,170

[45] Date of Patent: Dec. 3, 1991

[54] WETTABLE, RIGID GAS PERMEABLE, SUBSTANTIALLY NON-SWELLABLE CONTACT LENS CONTAINING BLOCK COPOLYMER POLYSILOXANE-POLYOXYALKYLENE BACKBONE UNITS, AND USE THEREOF

[75] Inventors: J. Richard Robertson; Kai C. Su, both of Alpharetta, Ga.

[73] Assignee: Ciba-Geigy Corporation, Ardsley, N.Y.

[21] Appl. No.: 342,849

[22] Filed: Apr. 24, 1989

Related U.S. Application Data

[63] Continuation-in-part of Ser. No. 315,222, Feb. 23, 1989, abandoned, which is a continuation of Ser. No. 160,968, Feb. 26, 1988, abandoned.

[51] Int. Cl.$^5$ .............................................. C08G 77/04
[52] U.S. Cl. ........................................ 528/25; 528/26; 528/28; 528/29; 556/414; 556/421; 556/437; 556/438; 556/442
[58] Field of Search ...................... 528/28, 26, 25, 29; 556/421, 414, 437, 442, 438

[56] References Cited

U.S. PATENT DOCUMENTS

| | | | |
|---|---|---|---|
| 4,136,250 | 1/1979 | Mueller et al. | 528/29 |
| 4,259,467 | 3/1981 | Keogh et al. | 526/279 |
| 4,486,577 | 12/1984 | Mueller et al. | 525/474 |
| 4,605,712 | 8/1986 | Mueller et al. | 525/474 |
| 4,740,533 | 4/1988 | Su et al. | 528/28 |
| 4,859,780 | 8/1989 | Molock et al. | 546/221 |
| 4,921,956 | 5/1990 | Molock et al. | 544/168 |

OTHER PUBLICATIONS

Patent Abst. of Japan, 7, 146 (P-206) [1291], Jul. 25, 1983.

*Primary Examiner*—Melvyn I. Marquis
*Attorney, Agent, or Firm*—Luther A. R. Hall; William G. Hervey

[57] ABSTRACT

Contact lenses which are optically clear, wettable, of high oxygen permeability and substantially non-swellable in the aqueous ocular envionment of use, of a block copolymer containing polysiloxane and polyoxyalkylene oxide units are disclosed, as well as the preparation thereof and methods of treating vision defects therewith.

3 Claims, No Drawings

WETTABLE, RIGID GAS PERMEABLE, SUBSTANTIALLY NON-SWELLABLE CONTACT LENS CONTAINING BLOCK COPOLYMER POLYSILOXANE-POLYOXYALKYLENE BACKBONE UNITS, AND USE THEREOF

This is a continuation-in-part of application Ser. No. 315,222, filed on Feb. 23, 1989, now abandoned, which in turn is a continuation of application Ser. No. 160,968, filed on Feb. 26, 1988, now abandoned.

BACKGROUND OF THE INVENTION

1. Field of the Invention

This invention relates to ophthalmic devices, such as contact lenses and intraocular implants, and particularly contact lenses of a block copolymer containing polysiloxane and polyoxyalkylene oxide units possessing an advantageous blend of desirable properties including a) high oxygen permeability, b) good wettability, c) optical clarity and d) a substantial lack of aqueous swellability in the ocular environment of use. The invention further relates to the polymers from which the ophthalmic devices are fabricated and the special macromers used to prepare the polymers.

2. Background of the Invention

The use of siloxane containing materials of various types in the fabrication of ophthalmic devices is well known.

Thus, in U.S. Pat. Nos. 3,996,187; 3,996,189; 3,341,490 and 3,228,741 there are described contact lenses fabricated from poly (organosiloxanes) containing fillers. While such lenses are generally soft and of high oxygen permeability, the use of fillers such as silica, is indicated in order to increase the otherwise generally poor tear strength and tensile strength. Also, such silicone rubber lenses are characteristically both hydrophobic and lipophilic.

U.S. Pat. No. 3,808,178 discloses hard contact lenses fabricated from copolymers of a polysiloxanylalkyl acrylate or methacrylate ester and an alkyl acrylate or methacrylate ester. The monomers and polymers of the patent are hydrophobic and are incompatible with hydrophilic materials such as hydroxyethyl methacrylate.

U.S. Pat. No. 4,136,250 discloses hydrogels of a copolymer of about 20 to about 90% of a hydrophilic (or mixture of hydrophilic and hydrophobic) monomer and about 10 to about 80% of a polyolefinic siloxane macromer which can be used to fabricate a contact lens. Typically, such materials are recited to possess a degree of swelling of about 10 to about 12%. It has been found, however, that the presence of substantial amounts of water therein limits the oxygen permeability of such materials.

U.S. Pat. No. 4,153,641 relates, in relevant part, to contact lenses fabricated from a polymer of a polyorganosiloxane terminated with vinylic groups, or copolymers thereof with other monomers. The exemplified products therein are hydrophobic in nature.

U.S. Pat. No. 4,486,577 relates to copolymers of about 8 to 70% of a polysiloxane macromer containing at least two vinyl groups and 30-92% of a monomer which is at least predominantly water insoluble to make polymers useful, for example, as contact lenses.

Generally, such prior art contact lens compositions are either insufficiently hydrophilic in terms of surface wettability to be acceptable to the contact lens profession, even though they may possess high oxygen permeability, or such contact lenses are of acceptable wettability but the hydrophilicity is coupled with water swellability, which tends to limit optimum oxygen permeability.

It is an object of the present invention to overcome these and other disadvantages of the art by providing ophthalmic devices, such as contact lenses and corneal implants, possessing a high degree of surface wettability but which are substantially non-swellable in the aqueous environment of use and possessing a high degree of oxygen permeability by employing a crosslinked block polymer containing polysiloxane and polyalkylene oxide units.

A further object of the invention is to provide a method of correcting visual defects in the form of refractive errors by fitting to the patient's eye in need of the same, a corrective contact lens of such polymer. These and other objects of the invention are apparent from the following detailed description of the invention.

Another object of the invention is to provide novel macromers for accomplishing the above objects.

SUMMARY OF THE INVENTION

The present invention is directed to macromers, polymers derived therefrom, ophthalmic devices obtained from such polymers as well as methods of manufacturing each of the foregoing. Each of the above invention materials are comprised of segments "Seg" of the formula

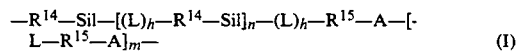

$$-R^{14}-Sil-[(L)_h-R^{14}-Sil]_n-(L)_h-R^{15}-A-[-L-R^{15}-A]_m- \qquad (I)$$

wherein Sil is a divalent poly(disubstituted siloxane), A is a divalent polyoxyalkylene oxide (which be may substituted), $R^{15}$ is oxygen or an amino nitrogen, $R^{14}$ is a bond, an amino nitrogen, or, when the adjacent atom of Sil is other than silicon, it is an oxygen, L is a divalent linking group, n is an integer of 0-3, and m is an integer of 0-10.

DETAILED DESCRIPTION OF THE INVENTION

The present invention relates to novel macromers, polymers fabricated therefrom, ophthalmic devices prepared from the polymers (especially contact lenses and intraocular lenses), as well as methods of manufacture of each. The ophthalmic devices ultimately fabricated are optically clear, hydrolytically stable, biologically inert, wettable, flexible, of good mechanical strength, oxygen permeable, and when fully swollen in its environment of use has a water content of at least 10%.

The macromer is a reactive monomer having a segment "Seg" of the formula

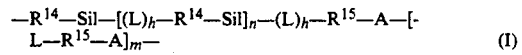

$$-R^{14}-Sil-[(L)_h-R^{14}-Sil]_n-(L)_h-R^{15}-A-[-L-R^{15}-A]_m- \qquad (I)$$

more preferably a segment "Grp" of the formula

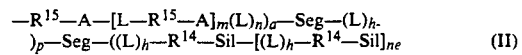

$$-R^{15}-A-[L-R^{15}-A]_m(L)_n)_q-Seg-(L)_h-)_p-Seg-((L)_h-R^{14}-Sil-[(L)_h-R^{14}-Sil]_{ne} \qquad (II)$$

and most preferably of the formula

$$Cap-Grp-Cap \qquad (III)$$

wherein

'Cap', 'Grp', 'Sil', are singular variables (i.e. the 'a' within 'Cap' is not a separate variable);

a is zero or 1;
e is zero or 1;
a+e=1;
h is 1, but may also be zero when the atom of Sil, to which it would otherwise be attached, is a carbon atom;
n is zero-3;
m is zero-10;
p is zero-7;
each $R^{14}$ is a bond, $-N(R^1)-$ or $-O-$, provided that it may not be an oxygen if $R^{14}$ is attached directly to a silicon atom or another oxygen atom, and may not be $-N(R^1)-$ if $R^{14}$ is attached directly to an oxygen or to a nitrogen;
$R^{15}$ is $-O-$ or $-N(R^1)-$, with $R^1$ being H, $C_{1-4}$alkyl, or phenyl;
each Sil is independently of the formula $$-R^{36}-(Sil^2)_{(x1)}[(Sil^3)(Sil^4)_{(x2)}(Sil^5)_{(x3)}R^{37}-R^{14}-\qquad \text{IV}$$

wherein (x1) and (x3) are each independently an integer of from 0–25;
(x2) is an integer of from 1–25;
each $Sil^2$, $Sil^3$, $Sil^4$ and $Sil^5$ is independently selected from a) linear siloxanes of the formula ($IV^1$)

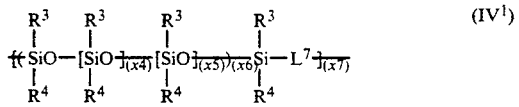

and b) cyclic siloxanes of the formula ($IV^2$)

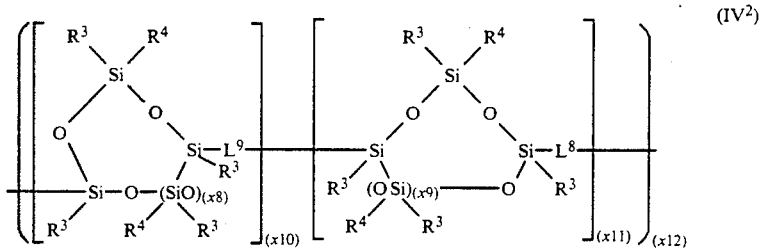

provided that $Sil^2$ is not the same as $Sil^3$ and $Sil^5$ is not the same as $Sil^4$, and $Sil^3$ and $Sil^4$ are the same or different;

each $R^3$ may be the same or different;
each $R^4$ may be the same or different;
each of x4, x5, x6, and x10 is independently zero to 25;
each of x7, x11, and x12 is independently 1 to 25;
each of x8 and x9 is independently zero or one;
each of $R^3$ and $R^4$ is independently selected from
a) $C_{1-18}$ alkyl and aryl of up to 12 carbon atoms, each of which is unsubstituted or substituted by halogen, preferably fluoro, or by $C_{1-4}$alkyl,
b) halogen, preferably fluoro; and
c) a group of the formula $$(OSiR^{38}R^{38})(x13)R^{39} \qquad (XI)$$

wherein each $R^{38}$ is independently $C_{1-14}$alkyl, $-O-Si)(R^{40})$, or $C_{6-12}$ aryl, with each $R^{40}$ and $R^{39}$ independently selected from $C_{1-4}$alkyl, $C_{6-12}$aryl, epoxy, halogen, hydroxy $C_{1-4}$alkyl, amino, amino $C_{1-4}$alkyl, hydroxy, isocyanto, and isothiocyanato; and (x13) is an integer of from 1 to 3;

$L^9$ is a linking group of the formula $$-L^{10}-(G-L^{10})_{(a3)} \qquad (XII)$$

wherein a3 is zero or one;
each $L^{10}$ is selected from

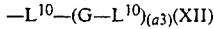
and $-O-$, when a3 is zero or one, and further from

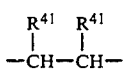

when a3 is one, and in which the atom of $L^{10}$ bonded to a silicon atom is either a saturated carbon atom or an oxygen atom, and each $R^{41}$ is independently H or lower alkyl, preferably H or methyl;

$L^7$ and $L^8$ are each selected from a) a group of formula (XII) when linking 2 silicon atoms and b) a group of the formula $$-L^{10}-(G-L^{11})_{(a4)} \qquad (XIII)$$

when not linking two silicon atoms and $L^{10}$ is bound to a silicon atom, in which (a4) is zero or one and
$L^{11}$ is selected from a bond,

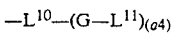

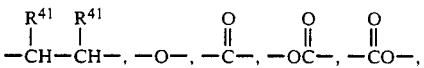

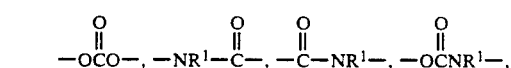

$R^{36}$ is selected from a bond and groups of formula XII and XIII;
$R^{37}$ is selected from a bond and groups of formula XII and XIII;
G is selected from the group of
i) a divalent, aliphatic linking group, preferably alkyl, alkenyl, or alkynyl, of up to 25 carbon atoms which may be interrupted by an interrupting unit selected from

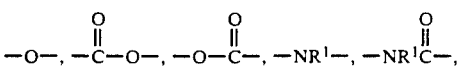

-continued

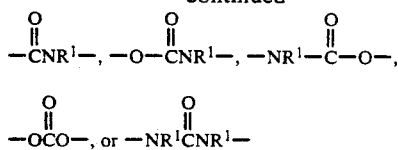

and which divalent groups may be substituted by lower alkyl;

(ii) a divalent 5-7 membered cycloaliphatic, a divalent 5-7 membered cycloaliphatic-C$_{1-18}$ aliphatic, and a divalent C$_{1-18}$ aliphatic-5-7 membered cycloaliphatic -C$_{1-18}$aliphatic, each of which may be interrupted in the non cyclic portion or between the cyclic and noncyclic portions thereof by an interrupting unit or substituted by a substituent or both interrupted and substituted as set forth in i) above;

(iii) a divalent C$_{6-25}$ arylene which is unsubstituted or substituted by a substituent selected from halogen, C$_{1-4}$ alkyl, C$_{1-12}$ perhaloalkyl, amino, carboxy, C$_{1-4}$ alkoxy carbonyl, amino carbonyl, C$_{1-4}$ alkylaminocarbonyl, di(C$_{1-4}$ alkyl) amino carbonyl and a polyglycol of the formula

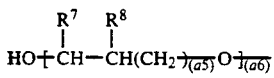

wherein (a5) is zero or 1;

one of R$^{42}$ and R$^{43}$ is H and the other is methyl or hydrogen when (a5) is zero and both R$^{42}$ and R$^{43}$ are H when (a5) is one; and (iv) (a6) is an integer of up to 60, preferably up to 25; a divalent aralkyl or alkaryl, having 7-25 carbon atoms, each of which may be interrupted in the alkyl portion or between the alkyl and aryl portions by an interrupting group set forth in i) above, and each of said uninterrupted and interrupted aralkyl and alkaryl groups is unsubstituted or substituted on the aryl ring as set forth iii and/or substituted in the alkyl portion by a substituent set forth in i);

(v) a divalent aliphatyl-aryl-aliphatyl wherein the total number of aliphatyl carbon atoms is up to 40, preferably up to 25, and the aryl portion being C$_{6-14}$, each aliphatyl portion being alkylene, alkenylene, or alkynylene, the aliphatyl portions being uninterrupted or interrupted by an interrupting unit set forth in i) above, the aliphatyl-aryl-aliphatyl also being possibly interrupted between one or both of the aliphatyl groups and the aryl group by an interrupting group as set forth in i) above, the aliphatyl groups being unsubstituted or substituted by a substituent set forth in i) above, and/or the aryl portion being unsubstituted or substituted by a substituent set forth in iii) above;

each L is independently selected from —L$^1$R$^6$L$^2$— wherein L$^1$ and L$^2$ are each independently

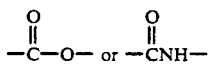

in which the oxygen or amino nitrogen respectively is bound to R$^6$, or independently L$^1$ and L$^2$ may also independently be

or a bond, and each R$^6$ is independently selected from
  i) a divalent aliphatic group of up to 25 carbon atoms;
  ii) of the formula —(C$_{1-20}$aliphatic)$_j$—Q$_k$—[(5-7 membered cycloaliphatic or aryl of up to 25 carbon atoms)Q$_{(k1)}$—(C$_{1-20}$aliphatic)$_{(j1)}$]$_D$—, (IX)

each of j, k, d and q being independently zero or one, but if j=0, k=0 and if q=0; d=0; wherein each aliphatic group in i) and ii) above may be interrupted at any point by Q, and each aliphatic, cycloaliphatic and aryl group in i) or ii) may be singly or multiply substituted by one or more of halogen, hydroxy, C$_{1-4}$alkyl, carboxy or C$_{1-12}$ perhaloalkyl;

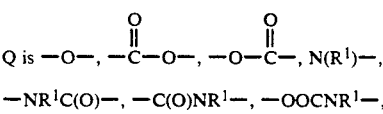

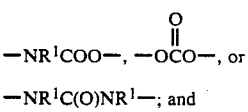

—NR$^1$C(O)NR$^1$—; and

D is 1-3;

each A is independently of the formula

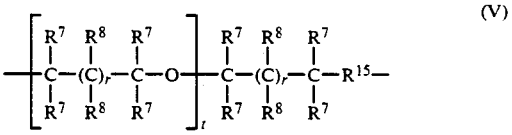

wherein
  each r is 0-4;
  t is 3-200;
  each R$^7$ is independently selected from groups i) and iii) below and each R$^8$ is independently selected from groups i)-iv) below:

i) hydrogen, halogen, unsubstituted C$_{1-16}$alkyl, substituted C$_{1-16}$alkyl, unsubstituted C$_{2-16}$alkenyl, and substituted C$_{2-16}$alkenyl, wherein a) the substituents on the alkyl and alkenyl groups in i) are independently selected from fluoro, C$_{1-16}$alkoxy, C$_{2-16}$alkanoyloxy, C$_{1-16}$alkoxy-C(O)—C$_{2-16}$alkenyloxy-C(O)—, C$_{3-16}$alkenoyloxy, aryl of up to 10 carbon atoms, aryloxy of up to 10 carbon atoms, aroyl of up to 11 carbon atoms, aroyloxy of up to 11 carbon atoms, aryl (of up to 10 carbon atoms)-oxycarbonyl, C$_{3-8}$cycloalkyl, C$_{3-8}$cycloalkoxy, (C$_{3-8}$cycloalkyl)-carbonyloxy, (C$_{3-8}$cycloalkoxy)carbonyl, oxacycloalkyl of up to 7 carbon atoms, oxacycloalkoxy of up to 7 carbon atoms, oxacycloalkoxy (of up to 7 carbon atoms)-carbonyl, and oxacycloalkyl (of up to 7 carbon atoms)-carbonyloxy; and b) each alkyl and alkenyl group in a) being unsubstituted or further substituted by fluoro, C$_{1-6}$alkyl, or C$_{1-6}$alkoxy provided that said last mentioned alkoxy is not bound to a carbon already singly bound to another oxygen atom; and ii) C$_{1-16}$alkoxy, C$_{2-16}$alkanoyloxy, C$_{1-16}$alkoxy-C(O)-, C$_{2-16}$alkenyloxy-C(O)- and C$_{3-16}$alkenoyloxy, each of which carbon atoms, or C$_{1-6}$alkoxy provided that the last mentioned alkoxy is not bound to a carbon atom which is singly bound to another oxygen;

iii) aryl of up to 10 carbon atoms, C$_{3-8}$cycloalkyl, and oxacycloalkyl of up to 7 carbon atoms, each of which is unsubstituted or substituted by a substituent selected from those indicated in i)a) and b) above;

iv) aryloxy of up to 10 carbon atoms, cycloalkoxy of up to 8 carbons, cycloalkyl (of up to 8 carbons)-C(O)0-, cycloalkoxy (of up to 8 carbons)-carbonyl, aroyloxy of up to 11 carbons, oxacycloalkoxy of up to 7 carbons, oxacycloalkenyloxy of up to 7 carbons, oxacycloalkoxy (of up to 7 carbon atoms)-carbonyl, oxacycloalkyl (of up to 7 carbon atoms)-carbonyloxy, aryloxy of up to 11 carbon atoms, and aroyloxy of up to 11 carbon atoms, each of which is unsubstituted or substituted by fluoro, C$_{1-6}$alkyl, or C$_{1-6}$alkoxy, provided said last mentioned alkoxy is not bound to a carbon atom which is singly bound to another oxygen; and 2 adjacent groups R$^7$ and R$^8$, together with the atoms to which they are attached may define a 5-8 membered cycloalkyl, cycloalkenyl, or oxacycloalkyl ring or a 6-14 membered bicyclo-ring;

Each Cap is independently selected from
i) a vinyl containing group of the formula

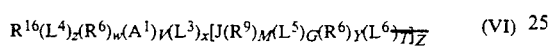  (VI)

or ii) a group of the formula

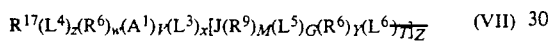  (VII)

at least one Cap per macromer being of formula VI; wherein
R$^{16}$ of the formula

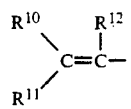  (VIII)

in which R$^{12}$ is hydrogen or C$_{1-7}$alkyl and each of R$^{10}$ and R$^{11}$ is independently H, C$_{1-7}$alkyl, or —COOR$^{13}$ with R$^{13}$ being H or C$_{1-4}$ alkyl;

w, x and z are each independently zero or one but if w is zero, one of x and z must be zero;
L$^3$ is

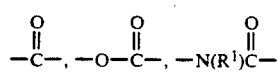

with the right hand portion attached to Grp provided that the Grp atom to which L$^3$ is attached is not a carbonyl carbon an amido nitrogen or a carboxy oxygen and L$^3$ is —O— or —NR$^1$— when such Grp atom is a carbonyl carbon;
L$^4$ is

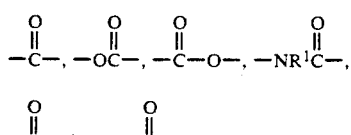

—N(R$^1$)CN(R$^1$)— or

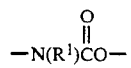

when w is one, and selected from the same group as L$^3$ when w is zero;
A$^1$ is

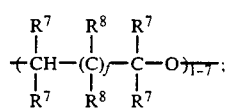

L$^5$ is

with the carbonyl attached to R$^9$ or J;
L$^6$ is

with the nitrogen attached to R$^6$ or R$^9$;
J is —O— or —NH—;
G, Y, M, T, V, and Z are independently 0 or 1, but if Y is zero, then G is zero and M is one; and
R$^9$ is

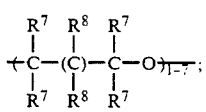

and R$^{17}$ is selected from
a) H, NH$_2$, OH, —NCO, —NCS,

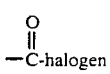

and COOR$^{12}$ when the non-R$^{17}$ atom to which it is attached is a non-carbonyl saturated carbon or the non-R$^{17}$ atom to which it is attached is a carbon which is part of a ring;
b) H,

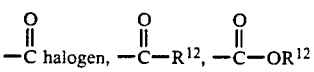

and R$^{12}$ when the non-R$^{17}$ atom to which it is attached is an oxygen other than a carboxy oxygen;
c) H and R$^{12}$, when the non-R$^{17}$ atom to which it is attached is a carboxy oxygen;
d)

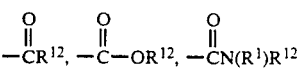

and R$^{12}$ when the non-R$^{17}$ atom to which it is attached is an amino nitrogen, or R$^{12}$ when the non-R$^{17}$ atom to which it is attached is an amido nitrogen;

e) OH, $R^{12}$, $NH_2$, and $-NHR^{12}$ when the non-$R^{17}$ atom to which it is attached is a carboxy carbon; and f) H, OH, hal, $-OR^{12}$ when the non-$R^{17}$ atom to which it is attached is silicon.

The macromers of formulae I, II, and III or mixtures thereof are polymerized into polymers which may be shaped into ophthalmic devices such as intraocular implants and contact lenses or utilized as active agent releasing materials, especially release rate controlling membranes or matrices in transdermal drug delivery devices or as tablet release matrices in various applications. The polymers and ophthalmic devices of the invention will swell, when in contact with sufficient aqueous medium, until a fully swollen water content of from at least 10% to about 95% has been reached.

The ophthalmic devices and polymers of the invention exhibit a receding contact angle of less than 60; the measurement of which is conveniently performed using a modified "Wilhelmy Plate" technique, as described for example in J. D. Androde et al, *Surface and Interfacial Aspects of Biomedical Polymers*, Vol. 1, *Surface Chemistry and Physics*, Plenam Press, 1985, wherein a specimen sample, in the form of a plate of known dimensions, is immersed into the wetting solution, pure water, at a slow controlled rate, e.g. at 2-20 mm per minute.

The invention ophthalmic devices also have a high oxygen permeability, Dk. Dk is measured using a modification of ASTM standard D3985-81 in that a) 21% oxygen, i.e. air, is used instead of 99-100% oxygen, b) 0.5 m² surface area is used instead of 100 m², and a) the humidity is 95-100% relative humidity instead of 0% relative humidity. Typically, conventional, fully swollen polyhydroxyethylmethacrylate (pHEMA) lenses which are sparingly crosslinked have a Dk of 5-7 $(5-7\times 10^{-10}$ mm.cc$O_2$/cm² sec mmHg) or $5-7\times 10^{-10}$ cm/sec or 5-7 barrers. The oxygen permeability of the instant invention ophthalmic devices have Dk values generally greater than 7-10 $(10^{-10}$ cm/sec) or 7-10 barrers.

Preferred macromers of formulae I, II and III are those wherein n is zero or one, most preferably zero. Another group of preferred macromers of formulae I–III are those where m is 0-4, more preferably zero or one, most preferably zero. A highly preferred group of macromers of formulae I–III are those wherein both m and n are zero or one, most preferably both m and n are zero, to result in $Seg^1$, a most highly preferred embodiment of Seg, of the formula $$-R^{14}-Sil-(L)_n-R^{15}-A- \qquad (I^1)$$

and $Grp^1$, a most highly preferred embodiment of Grp, of the formula $$-R^{15}-A-(L)_n)_a-Seg^1-((L)_h-R^{14}-Sil_e \qquad (II^a).$$

Within Sil above, b and f are each independently preferably one, with a highly preferred embodiment being when both b and f are one;

$R^2$ and $R^5$ are each independently preferably $C_{1-7}$ alkylene, $C_{1-4}$alkylene-(oxy-$C_{2-4}$alkylene)g- (wherein g is 1-10, preferably 1-4, more preferably 1-2, most preferably 1) or $C_{2-4}$alkylene-oxy-$CH_2$-(hydroxy-$C_{1-2}$alkylene)-$CH_2$, more preferably $C_{1-4}$alkylene or $-CH_2-(OC_2H_4)_g-$ with g preferably 1 or 2, most preferably 2. In all cases within $R^2$ and $R^5$, alkylene of greater than 2 carbons is preferably branched.

Within Sil of formula IV, y is preferably 5-100, more preferably 10-50, most preferably 20-30. A particularly useful subembodiment has y=25-29, especially when a=1 and e=zero.

$R^{14}$ is preferably a bond or $-O-$, more preferably $-O-$.

$R^1$ is preferably $CH_3$ or H, more preferably H.

Each $R^3$ and $R^4$ is independently preferably $C_{1-7}$alkyl or phenyl, more preferably $C_{1-4}$alkyl, still more preferably methyl or ethyl, most preferably methyl. A most preferably embodiment of Sil is when all of $R^3$ and $R^4$ are the same.

$R^{15}$ is preferably $-O-$ or $-NH-$, more preferably $-O-$.

Each h is independently preferably 1, most preferably each h is one.

p is preferably 0-5, still more preferably 0-3, most preferably 0 or 1.

As stated above, linking group L is $L^1R^6L^2$ wherein $L^1$ and $L^2$ are independently $-COO-$ or $-C(O)NH-$ (in which the oxygen or amido nitrogen is bound to $R^6$) or

or a bond. Preferably, each $L^1$ and $L^2$ is independently $-COO-$, $-C(O)NH-$, or

more preferably

or $-C(O)NH-$ and most preferably

In a most highly preferred embodiment, all of the $L^1$ groups are the same and all of the $L^2$ groups are the same.

In a still more highly preferred subembodiment, $L^1$ and $L^2$ are the same groups.

Each $R^6$ is preferably independently selected from i) a divalent aliphatic group of up to 12 carbon atoms, preferably up to 7 carbon atoms, more preferably up to 4 carbon atoms;

ii) -$(C_{1-20}$aliphatic$)_j$-$Q_k$[(5-7 membered cycloaliphatic or aryl of up to 25 carbon atoms)-$Q_d$-$(C_{1-20}$ aliphatic$)_q]_D$- each of j, k, d and q being 0 or 1 but if j is zero, k must be zero and if q is zero, d must be zero; preferably each of the $C_{1-20}$ aliphatic groups in ii) are $C_{1-12}$ aliphatic, more preferably $C_{1-7}$ aliphatic, still more preferably $C_{1-4}$aliphatic, most preferably $C_{1-2}$ aliphatic; preferably the $C_{5-7}$ cycloaliphatic is $C_6$ cycloaliphatic, most preferably a cyclohexane; preferably the aryl of up to 25 carbons is up to 14 carbons, more preferably up to 10 carbons, still more preferably of 6 carbons, most preferably a phenyl ring; preferably k is zero and preferably d is zero, but most preferably k and d are each zero; wherein each aliphatic group within i) and ii) above may be interrupted at any point by Q and each aliphatic, cycloaliphatic, and aryl group in i) or ii) is unsubstituted or substituted by one or more of halogen (preferably fluorine or chlorine, most preferably fluorine), hydroxy, $C_{1-4}$alkyl (preferably methyl, ethyl, propyl, or isopropyl, more preferably methyl or ethyl, most preferably methyl), carboxy, or $C_{1-12}$ perhaloalkyl (preferably $C_{1-7}$ per haloalkyl, more preferably $C_{1-4}$perhaloalkyl, still more preferably perhalomethyl, perhaloethyl, or perhalopropyl, most preferably perhalomethyl, with the halogen atom being preferably the same and preferably fluorine or chlorine, most preferably fluorine. D is preferably 1 or 2, more preferably 1.

Most preferably, the $R^6$ aliphatic groups are not interrupted by Q, and preferably are unsubstituted Also most preferably, the $R^6$ cycloaliphatic groups are substituted by 1-4 substituents, preferably 1-3 substituents, which substituents are preferably selected from halogen (preferably fluorine), hydroxy, and $C_{1-4}$alkyl (preferably methyl, ethyl, propyl or isopropyl, most preferably methyl). In a most highly preferred embodiment each of the substituents is the same. Preferably, one of j and q is zero when the $R^6$ group contains a cycloaliphatic. The most highly preferred cycloaliphatic containing $R^6$ is (5-yl-1,3,3-trimethylcyclohexyl)-methyl (the residue of isophorone diisocyanate absent the two isocyanate groups).

Preferably, the $R^6$ aryl groups are unsubstituted or substituted by 1-4 substituents, preferably unsubstituted or substituted by 1 or 2 substituents, more preferably unsubstituted or substituted by 1 substituent which substituents are preferably selected from halogen (preferably fluorine), hydroxy, and $C_{1-4}$alkyl, more preferably $C_{1-4}$alkyl (preferably methyl, ethyl, propyl, or isopropyl, more preferably methyl). When more than one substituent is present per aryl, the substituents on any one aryl is preferably the same. A most highly preferred aryl embodiment of $R^6$ is toluenediyl.

A preferred subclass of $R^6$ includes ethane-1,2-diyl; propane-1,2-diyl; propane-1,3-diyl; tetramethylene-diyl; hexane-1,6-diyl; cyclohexane-1,2-diyl; cyclohexane-1,3-diyl; 1,4-phenylene; bis[4-yl-cyclohexyl]methane; bis(4-yl-cyclohexenyl)methane; bis(4-yl-phenyl)methane; toluene-2,4-diyl; toluene-2,6-diyl; m- and p-tetramethylene-diyl; toluene-1,2-diyl; toluene-1,4-diyl; 3,3'-dichloro-4,4'-diyl-biphenyl; naphthalene-1,5-diyl; dihydro-toluene-diyl; tetrahydrotoluene-diyl; (5-yl-1,3,3-trimethylcyclohexyl)methyl; trimethylhexane-1,6-diyl (especially 2,2,4-trimethylhexane-1,6-diyl and 2,4,4-trimethylhexane-1,6-diyl); diethylfumarate-2,2'-diyl; 1-carboxypentane-1,5-diyl; naphthalene-1,2—, 1,3—, 1,6—, 1,7—, 1,8—, 2,7—, and 2,3-diyl; 1-methylnaphthalene-2,4- and 2,7-diyl; methylcyclohexane-1,4-diyl; 6(7)methylnaphthalene-1,3-diyl; biphenyl-4,4'-diyl; 3,3'-dimethoxybisphenyl-4,4'-diyl; 2,2'-dimethylbiphenyl-4,4'- and 3,3'-diyl; bis(4-ylphenyl)ethane; and bis(4-ylphenyl)ether.

The polyalkylene oxide groups are of formula V and are homo or copolymeric blocks having a total of 3-200 alkylene oxide units and an additional terminating alkylene oxide or amine. However, no individual A has a homopolymeric subblock in excess of 100 repeating units. The portion of the alkylene oxide alkylene chain in the macromer backbone is a straight chain of 2 (r=zero) to 6 (r=4) carbon atoms which may be unsubstituted or substituted as set forth previously.

Preferably the number of alkylene oxide units (i.e. t) is 3-150, more preferably 4-100, still more preferably 5-75, still even more preferably 6-70. Within this group are two highly preferred subembodiments, a) those with t of 25-70, preferably 50-68, most preferably 60-66 and b) those with t of 8-50, preferably at least 9, more preferably at least 10, still more preferably 13-35, even more preferably 15-30, most preferably 20-25, especially about 22.

While it is highly preferable that each A be of the same structure throughout the macromer, there is no such absolute requirement. Preferably at least 20% more preferably 25%, still more preferably 33%, yet more preferably 50%, even more preferably 75% and most preferably at least 90% of the A groups within any one macromer are the same.

Within each A group, there are two highly preferred subembodiments:

a) homopolymeric A units, b) copolymeric A units of the 'EXE' type with the 'X' portion having approximately twice the number of repeating units as either 'E' (i.e. a poloxamer or reverse poloxamer like grouping).

While these two arrangements are highly preferred, other arrangements of alkylene oxide copolymeric type are also suitable.

Substituents on the alkylene oxide backbone portion (i.e. $R^7$ and $R^8$) are preferably selected from as set forth above. Preferably, each alkyl group within $R^7$ or $R^8$ whether alone or as a part of a larger group, has up to 4 carbon atoms, more preferably methyl, ethyl, butyl, or t-butyl (provided that adjacent groups on a ring cannot each be t-butyl), most preferably methyl. Preferably, each alkenyl within $R^7$ or $R^8$, whether alone or as part of a larger group has 2-4 carbons, more preferably $C_{2-3}$alkenyl. An $R^7$ or $R^8$ aryl is preferably phenyl or naphthyl, most preferably phenyl. Cycloalkyl groups within $R^7$ and $R^8$ preferably have 5-6 ring members, most preferably 6 ring members. Oxacycloalkyl groups within $R^7$ or $R^8$ are preferably of 5-6 ring members, more preferably 6 members, each having only a single heteroatom in the ring which heteroatom is oxygen.

While the entire A unit may have a substantial fluorine substituent content, it is preferably at least 25% halogen free, more preferably at least 30% halogen free, still more preferably at least 40% halogen free, yet more preferably at least 60% halogen free, and most preferably substantially halogen free.

Preferably $R^7$ is hydrogen, $C_{1-7}$alkyl more preferably $C_{1-4}$alkyl, more preferably methyl; substituted $C_{1-4}$alkyl, most preferably substituted methyl; phenyl, substituted phenyl, benzyl, substituted benzyl, cyclohexyl, or $C_{4-5}$oxacycloalkyl, preferably $C_5$-oxacycloalkyl; each of the "substituents" preferably being $C_{1-6}$alkoxy (more preferably $C_{1-4}$alkoxy), fluorine, or when substituted on a group other than alkyl, $C_{1-6}$alkyl; the most preferable substituents being methoxy, fluorine, and when substituted on other than alkyl, methyl. Substituents on aryls within $R^7$ are preferably in the p-position. $R^8$ is preferably selected from the same group as $R^7$ and $C_{1-4}$alkoxy, phenoxy, and $C_6$cycloalkoxy, more preferably the same group as $R^7$.

At least one Cap per macromer is independently of Formulae VI or VII, but preferably the macromers have both Cap groups of formula VI. Most preferably, within each macromer the Cap groups are the same.

Preferably, the Cap groups are of formula VI in which $R^{16}$ is preferably a vinyl group of formula VIII in which $R^{11}$ is hydrogen, of $R^{10}$ is hydrogen, $C_{1-4}$alkyl (preferably methyl), or —COOR$^{13}$, with $R^{13}$ being H or methyl. More preferably the formula VI Cap groups have an $R^{16}$ which is a vinyl of formula VIII in which $R^{10}$ and $R^{11}$ are each hydrogen and $R^{12}$ is hydrogen or methyl.

Preferred Cap groups, whether of formula VI or VII are those wherein a) Z, w, x, z and V are all zero;
b) Z, w, V and x are all zero, z is one, and $L^4$ is $$-\overset{O}{\underset{\|}{C}}-, \quad -\overset{O}{\underset{\|}{C}}-NH-, \quad \text{or} \quad -\overset{O}{\underset{\|}{C}}-O-,$$

most preferably $$-\overset{O}{\underset{\|}{C}}-O, \quad \text{or} \quad -\overset{O}{\underset{\|}{C}}-$$

with the carbonyl in each case attached to $R^{16}$ or $R^{17}$;

c) Z, z and V are all zero, w and x are each one, $R^6$ is of formula IX wherein j, k, d and q are each zero, and D is one, and the aryl thereof is phenyl; and $L^3$ is $$-N\overset{O}{\underset{\|}{H}}C-$$

with the nitrogen thereof attached to $R^6$;

d) Z, w and x are zero, and V are one, $A^1$ is —CH$_2$CH$_2$O— with the carbon thereof attached to $L^4$, $L^4$ is $$-\overset{O}{\underset{\|}{C}}-O$$

with the carbonyl thereof attached to $R^{16}$ or $R^{17}$;

e) Z, V and x are zero, z and w are one, $L^4$ is $$-\overset{O}{\underset{\|}{C}}O-$$

with the carbonyl attached to $R^{16}$ or $R^{17}$, and $R^6$ being alkylene or hydroxy substituted alkylene of from 2-15 carbon atoms; and f) those groups of a-e above except that Z is one and wherein
  i) M and T are one, G and Y are zero, $R^9$ is $C_{2-15}$ alkylene or $C_{2-15}$ hydroxy substituted alkylene and $L^6$ is $$-N\overset{O}{\underset{\|}{H}}C-$$

with the nitrogen attached to $R^6$;
  ii) M, G, Y and T are all one, $R^9$ is $C_{2-15}$alkylene or $C_{2-15}$hydroxy substituted alkylene, $L^5$ is —NH-COO— with the oxygen bound to $R^9$, $R^6$ is as defined above, preferably a divalent aliphatic or cycloaliphatic or arylene group and $L^6$ is $$-N\overset{O}{\underset{\|}{H}}C-$$

with the nitrogen attached to $R^6$;
  iii) M is zero, G, Y and T are all one and $L^5R^6L^6$ is $$-\overset{O}{\underset{\|}{C}}NH-R^6-N\overset{O}{\underset{\|}{H}}C-.$$

Highly preferred vinyl containing Cap groups terminating the macromer are acryl, methacryl, and styryl groups bound directly to or through an ethyoxy or oxyethyloxy to the balance of Cap or to the non-Cap portion of the macromer.

Specifically preferred embodiments of the present invention within formulae II$^1$ and III include those wherein (i) Sil is $$-\overset{CH_3}{\underset{|}{C}}HCH_2CH_2\!-\!\!\left(\overset{CH_3}{\underset{\underset{CH_3}{|}}{Si}}\!-\!O\right)_{\!\!y}\!\!\overset{CH_3}{\underset{\underset{CH_3}{|}}{Si}}\!-\!CH_2CH_2\overset{CH_3}{\underset{|}{C}}H\!-\!O\!-\!;$$

a is one;
e is zero;
$R^{14}$ and $R^{15}$ are each —O—;
L is $$-\overset{O}{\underset{\|}{C}}NHCH_2-\underset{\underset{\underset{O}{\|}}{\underset{HNC-}{}}}{\overset{CH_3}{\underset{|}{\bigcirc}}}\overset{CH_3}{\underset{\underset{CH_3}{|}}{}};$$

h is one;
A is (CH$_2$CH$_2$O)$_i$; and
p is zero;
m is zero;
Cap is $$-\overset{O}{\underset{\|}{C}}NHCH_2CH_2O\overset{O}{\underset{\|}{C}}\underset{\underset{CH_3}{|}}{C}=CH_2.$$

(ii) Sil is $$-CH_2CH_2\!-\!\!\left(\overset{CH_3}{\underset{\underset{CH_3}{|}}{Si}}\!-\!O\right)_{\!\!y}\!\!\overset{CH_3}{\underset{\underset{CH_3}{|}}{Si}}\!-\!CH_2CH_2\!-\!$$

(especially y of about 4, 7, and about 16);
e is one;
$R^{14}$ is a bond;
$R^{15}$ is —O—;
a is zero;
L is $$-\overset{O}{\underset{\|}{C}}NH-\bigcirc$$

with the phenyl ring thereof bound to Sil;
p is zero;
n is zero;

A is 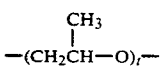,

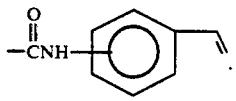

or a poloxamer or reverse poloxamer having t polyoxyalkylene units per A group (especially t of about 6-8, about 45-55, and about 90-95); and
each Cap is

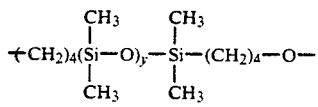

(iii) Sil is

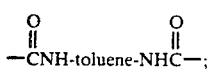

(especially with y of about 16-20);
a is zero;
e is one;
p is zero;
n is zero;
( $R^{15}$ is —O—;
$R^{14}$ is oxygen;
L is

each Cap is

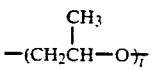

A is

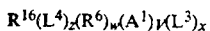

or —(CH$_2$CH$_2$—O)$_t$ (especially t of about 30-70).

An even more highly preferred macromer of formulae I-III are those within formula I$^a$ and II$^a$ having each Cap independently selected from formulae VI and VII in which Z is zero to result in Cap$^1$ of the formulae

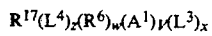  (VI$^1$)

and

  (VII$^1$)

and macromers of the formula

Cap$^1$-Grp$^1$-Cap$^1$   (II$^b$).

Very highly preferred macromers of formula IIb have $R^{16}$ in formula VI$^a$ selected from those of formula VIII wherein each of $R^{10}$-$R^{12}$ is independently hydrogen or methyl. Also preferred within this very highly preferred group are those wherein V is zero.

In the foregoing, all alkyl groups whether mentioned alone or as part of another group are preferably $C_1$-$C_4$-alkyl, such as methyl, ethyl, propyl and butyl, especially t-butyl, with the exception that adjacent groups on aryl rings cannot each be t-butyl. These alkyl groups may be straight chain or branched chain. When the alkyl is a substituent on a phenyl ring, it is preferably attached at the para position. Preferable alkenyl groups, whether alone or as part of another group, are preferably $C_2$-$C_4$alkenyl, such as ethenyl, propenyl and butenyl. Preferred aryl groups (whether alone or as part of another group) are phenyl and naphthyl, more preferably phenyl. Preferably the aryl groups are still further substituted by $C_1$-$C_4$alkyl, more preferably t-butyl, most preferably in the para position.

Color may be added to the polymerized material or to the macromers via typical dying techniques. One such manner is by insuring hydroxy groups are introduced onto the macromer backbone or substituent thereof.

Typical color groups useful in these embodiments include, but are not limited to, the hydroxy reactive dyes known in the art under the tradename Remazol, manufactured by American Hoechst. Examples of the Remazol dyes which are especially useful are:

Remazol Brill Blue RW (Color Index Code: Reactive Blue 19);

Remazol Yellow GR (Color Index Code: Reactive Yellow 15);

Remazol Black B (Color Index Code: Reactive Black 5);

Remazol Golden Orange 3GA (Color Index Code: Reactive Orange 78); and

Remazol Turquoise P (Color Index Code: Reactive Blue 21);

all of which have at least one group of the formula

—SO$_2$—CH$_2$CH$_2$O—SO$_3$(—)

which reacts with the polymer or monomer hydroxy group to yield

or

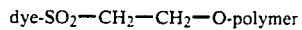

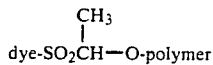

group, preferably the former. In such a manner, both excess free hydroxy groups are disposed of and colored contact lenses can be realized simultaneously. The color group or former can be reacted with the macromer before it is polymerized or afterwards. These excess free hydroxy groups can also be disposed of by utilizing them to crosslink the resultant polymer.

A vinylic comonomer is frequently utilized to increase the hydrophilicity of the final product without substantially altering the other properties (i.e. a hydrophilic modifier).

In addition to the hydrophilic modifier, other comonomers which may be present in the polymer are monomers coreactive with the macromer of formulae I-III. Such additional monomers may be present in a minor amount of up to about 20% by weight of the resultant polymer. When such comonomers are excessively hydrophobic, additional hydrophilic modifier may be incorporated so as to achieve the appropriate water content.

Usually, when present, hydrophobic vinylic comonomer are used in an amount of about 2% to about 80%, preferable no more than 70%, more preferable no more than 50%, by weight of the resultant polymer. When present, hydrophilic comonomers are used in an amount of about 2% to about 15% by weight of the resultant polymer preferably not in excess of 10% by weight relative to the macromer of formulae I-III. Advantageously, no more than 5% of vinylic comonomer is used when the macromer of formulae I-III has a molecular weight in excess of 8000. Generally, when the macromer of formulae I-III has a molecular weight of under about 4000, up to 10% by weight of hydrophilic vinylic comonomer can be used. When the compound of formulae I-III has a molecular weight between 4,000 and 8,000, the maximum amount of hydrophilic vinylic comonomer is between 5% and 10% by weight. Most preferably, the instant polymers are free or substantially free from such hydrophilic modifier monomers and other monomers not of formula I.

The hydrophilic modifier is a monomer which is coreactive with a monomer of formula I and is typically selected from a) polyethylene glycols of the formula

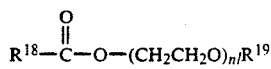

(A)

or b) pyrrolidones of the formula

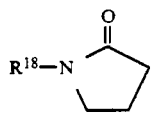

(B)

wherein $R^{19}$ hydrogen or $C_1$-$C_7$ alkyl, preferably $C_1$-$C_4$ alkyl, and $n_1$ is an integer of from 1-25 or c) of the formula

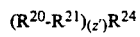

(C)

wherein $R^{18}$ is a polymerizable or reactive moiety selected from i) ethylenically unsaturated radicals, preferably vinyl, 1-methylvinyl, 2-methylvinyl, or allyl, ii) anhydrides, iii) amines, iv) acids, v) esters, vi) amides, vii) ethers, viii) acid halides; $R^{20}$ is selected from i) $R^{18}$ and ii) epoxy groups, especially glycidyl, iii) isocyanates or isothiocyanates, and iv) hydroxy;

$R^{21}$ is selected from i) a divalent aliphatic group of up to 25 carbon atoms, preferably alkyl, alkenyl or alkynyl, which may also be interrupted, or terminated, or interrupted and terminated by oxy, carboxyloxy, amino, aminocarbonyl, oxycarbonyl, ureido, oxycarbonylamino, or carbonylamino;

ii) a divalent 5-7 membered cycloaliphatic or a 5-7 membered cycloaliphatic-$C_1$-$C_{20}$-aliphatic which may also be interrupted, terminated, or interrupted and terminated as in group i) above except that said interruptions cannot occur within said cycloaliphatic portions;

iii) a divalent arylene having 6-25 carbon atoms which is unsubstituted or substituted by at least one substituent selected from halogen, $C_1$-$C_4$ alkyl, and $C_1$-$C_{12}$ perhaloalkyl;

iv) a divalent aralkyl or alkaryl or -alkylene-arylalkylene- having 7-25 carbon atoms which is uninterrupted or interrupted in the alkyl portion, or terminated, or interrupted in the alkyl portion and terminated with an interrupting or terminating group as mentioned in i) above, and each of said uninterrupted, interrupted, and terminated aralkyl and alkaryl groups is further unsubstituted or substituted by a substituent selected from halogen, $C_{1-4}$ alkyl, and $C_{1-12}$ perhaloalkyl;

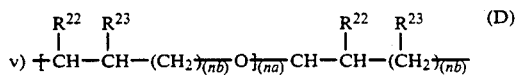

(D)

wherein a) $R^{22}$ is hydrogen, $R^{23}$ is methyl, and (nb) is zero;

b) $R^{22}$ is methyl, $R^{23}$ is hydrogen, and (nb) is zero;

or c) $R^{22}$ and $R^{23}$ are hydrogen and (nb) is 1; and (na) is an integer of 8-100;

(z') is an integer of 1 up to the valence of $R^{24}$ and where (z') is less than the valence of $R^{24}$, the remaining valences are taken up with hydrogens;

and $R^{24}$ is a hydrophilic group selected from i) morpholino; cyclic amide radicals of 5-7 ring members; saturated and unsaturated cyclic N,N-diamide radicals of 5-6 ring members; groups of the formula

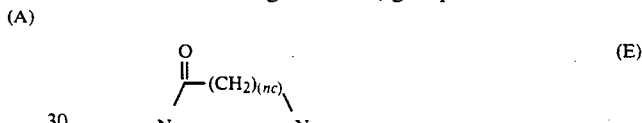

(E)

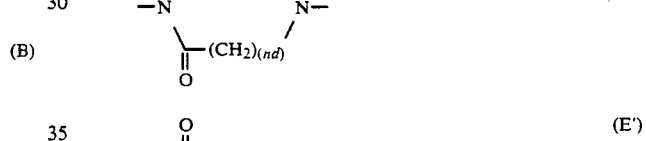

(E')

wherein (nc) and (nd) are selected from 0-2 but having 6-7 ring members; and cyclic amines of 5-6 ring members; each unsubstituted or substituted by hydroxy-$C_{1-5}$ alkyl, carboxy, or lower alkyl;

ii) tetrahydrofurfuryl;

iii) mono, di, and poly saccharide radicals, whether straight chain or cyclic, their corresponding sugar alcohol radicals, pentaerythritol radicals, and polyvinyl alcohol radicals; and iv) poly hydroxy $C_2$-$C_7$ alkyl radicals; and said reactive group $R^{18}$ is capable of reacting with one or more sites in said formula I.

Preferably the hydrophilic modifier has $R^{20}$ selected from a) $H_2$

and the terminus of $R^{21}$ to which it is attached is —C(O)$R^{26}$— with the carbonyl being bound to $R^{18}$ where $R^{25}$ is H or methyl and $R^{26}$ is —O—, or —NR$^{27}$— with $R^{27}$ being H or lower alkyl;

b) $H_2C$=CH— and the terminus of $R^{21}$ to which it is attached is

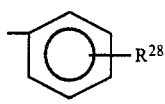

with the left hand bond being bound to $R^{20}$ wherein $R^{28}$ is —O—, —NR$^{27}$—, —C(O)—,

or —C(O)O—; and c)

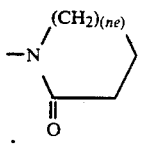

and the terminus of $R^{21}$ to which it is attached is —C(O)R$^{30}$— in which the carbonyl is bound to $R^{20}$ wherein $R^{30}$ is lower alkylene or —[CH$_2$CH(lower alkyl)—O]—$_{1-5}$ and $R^{29}$ is hydrogen, lower alkyl, or —CN; and $R^{24}$ is preferably selected from a) morpholino which is unsubstituted or mono-tetra substituted by lower alkyl, preferably methyl or ethyl;

b)

where (ne) is one, two, or three, preferably 1, each of which is unsubstituted or substituted, preferably mono or di substituted, by lower alkyl, preferably methyl or ethyl;

c)

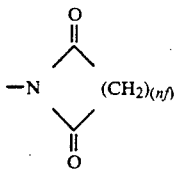

where nf is 2 or 3, preferably 2, each of which is unsubstituted or substituted by lower alkyl, preferably methyl or ethyl;

d) a divalent group of the formula

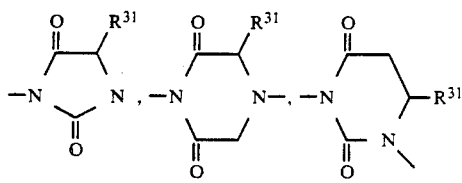

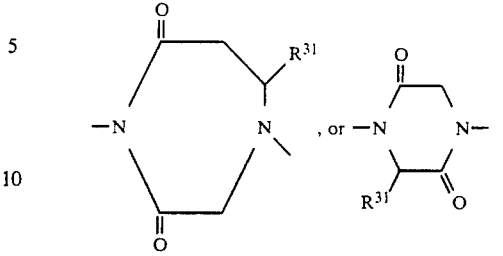

wherein $R^{31}$ is H or —COOH;

e)

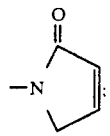

f)

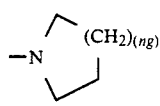

where ng is one or two, each of which is unsubstituted or substituted by lower alkyl, preferably methyl or ethyl;

g)

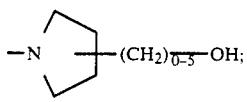

h) a polyol selected from polyvinyl alcohol radicals,

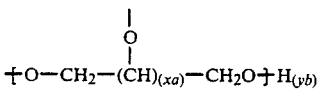

wherein (xa) is 2–10, preferably 3–4, and (yb) is an integer from 0, preferably at least 0.5(xa), up to (xa+1) inclusive, preferably (xa−2) to (xa+1), the cyclic saccharide analogs thereof, the di-tetra saccharides thereof, preferably having saccharide-saccharide links between the 1 and 4 carbon positions thereof, preferably β linkages, C(CH$_2$O)$_4$ H$_{(ya)}$ wherein (ya) is 0–3, and poly hydroxy lower alkylene glycol radicals wherein up to 50%, preferably up to 25%, more preferably up to 10%, of the hydroxy groups are missing their alcoholic hydrogens.

Most preferably the hydrophilic modifier of formula C is selected from

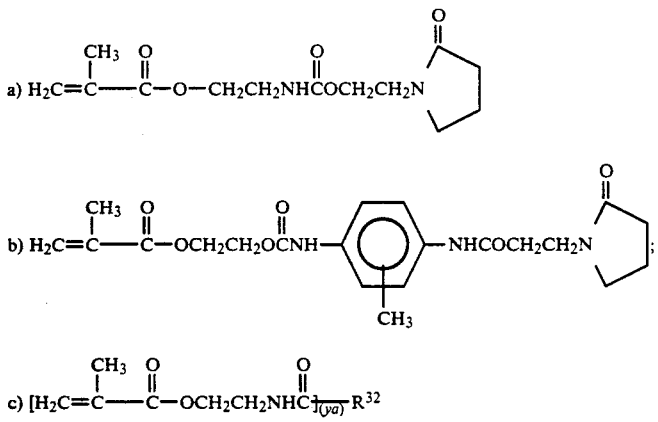

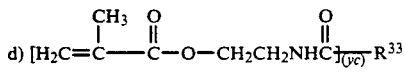

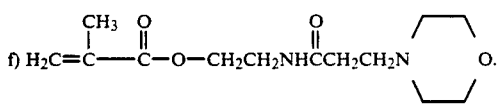

wherein $R^{32}$ is $-[OCH_2(CH)_{(xa)}CH_2O]-H_{(yb)}$ in which (xa) is 1-6 preferably 3-4 and (yb) is 0 up to (xa+1), preferably (xa-1) to (xa+1), more preferably (xa) to (xa+1), and (ya) is 1 up to (xa+2−yb)

d) $[H_2C=\underset{\underset{CH_3}{|}}{C}-\underset{\underset{O}{||}}{C}-O-CH_2CH_2NH\underset{(yc)}{C}]-R^{33}$ and $R^{33}$ is $C(CH_2O)4H_4$-(yc) wherein (yc) is 1-4, preferably 1-2;

e) polyvinyl alcohol having at least one and up to 50% preferably 25%, more preferably 10%, inclusive, of the alcoholic hydrogens thereof absent;

f) $H_2C=\underset{\underset{CH_3}{|}}{C}-\underset{\underset{O}{||}}{C}-O-CH_2CH_2NH\underset{\underset{O}{||}}{C}CH_2CH_2N\underset{\diagdown\_\diagup}{\diagup^{\frown}\diagdown}O.$ greater detail regarding the hydrophilic modifier monomers can be found in a copending U.S. application Ser. No. 160,623, filed Feb. 26, 1988, now U.S. Pat. No. 4,859,780, entitled Hydrophilic Modifier Monomers, invented by Frank Molock, Richard Robertson and Kai Su.

Preferably, when Cap is a vinyl containing group or one or more of the aforementioned R groups within formulae I-II contain an ethylenically unsaturated group, then the macromer can be crosslinked in the presence of a vinylic group containing hydrophilic modifier and/or vinylic group containing crosslinking agents. The instant macromer can be crosslinked in the presence or absence of up to less than about 50%, preferably up to about 30%, most preferably up to about 10% by weight of vinylically unsaturated hydrophilic modifiers and/or other vinylic comonomers.

When Cap does not have a vinyl group, but takes part in crosslinking, Cap is of formula VII. Crosslinking is then typically carried out by condensation with a tri or polyfunctional coreactive monomer. For example, when Cap terminates in OH, then the coreactive monomer functional group can be —COOH, OCN, SCN, —NH$_2$, —NH(alkyl) etc.; when Cap terminates in —NH$_2$ or —NH(alkyl), the reactive comonomer functional group can be a conventional acyl leaving group; and when Cap terminates in OCN— or SCN—, then the reactive comonomer functional group can be OH. Similarly, the other coreactive functional groups mentioned in terms of either Cap or the coreactive monomer can be interchanged.

Suitable vinylic monomers and coreactive monomers for condensation are set forth below. However, the list is not exhaustive and those of ordinary skill will appreciate the modifications, additions, and alternatives which may also be employed.

However, the degree of crosslinking in the finished crosslinked polymer should not exceed 20%, preferably not greater than 10%, morepreferably not greater than 5%, still more preferably 1-4%, most preferably 2-3%.

A highly preferred embodiment within the polymers fabricated from macromers of formula I, requires that not more than 20-70%, preferably not more than 50% of the A groups are polyethylene glycol. In another highly preferred group A is homopolymeric polyethylene oxide or polypropylene oxide.

The number of A units and the chain length and nature of the substituents on the polyoxyethylene segment is determined by the degree of wettability desired in the polymer of the compound of formula I. In general, the polymer should be sufficiently hydrophilic in its surface properties such that the polymer exhibits a contact angle with distilled water at 20° C. of less than 60°, preferably less than 40°, more preferably less than 25°, still more preferably less than 15°, most preferably less than 10°.

The greater the number of siloxane units, the greater the number of oxyalkylene units is generally required to reduce the contact angle to within the above limits.

Further, a large excess of unsubstituted oxyethylene units in the polymer is to be avoided, as such excess units tend to cause the polymer to be swellable. As water is taken up, the oxygen permeability of such polymers tends to be drastically reduced. Advantageously, the instant polymers absorb less than about 10% by weight water, preferably less than about 5% by weight, most preferably less than 3% by weight water.

Preferred crosslinked polymers are those consisting essentially of a polymer of a divinylic monomer according to formula III wherein $R^3$ and $R^4$ are methyl, (x4+x5) times x6 is 2-20; $R^{36}$ and $R^{37}$ are each $C_{2-4}$alkylene; each A is a $C_{3-10}$alkyl-1,2-diyl with t=4-40.

Highly preferred are those polymers which exhibit a contact angle of less than 25°, more preferably less than 15° and most preferably less than 10°.

The reactive vinylic macromers of the invention can characteristically be polymerized to form crosslinked polymers under conventional polymerization conditions.

If desired, the monomer reaction mixture may contain a catalytic amount of a conventional polymerization catalyst, preferably a free radical catalyst.

Of particular interest are conventional peroxide and azo catalysts, such as hydrogen peroxide, benzoyl peroxide, tert-butyl peroctoate, benzoyl peroxide or azobis (isobutyrlnitrile).

The polymerization can generally be carried out at temperatures between about 20° to about 150° C., for a period between about 1 to about 24 hours. It is understood that the time and temperature in such a reaction are inversely related. Thus, temperatures employed in the upper end of the temperature range will generally provide reaction times near the lower end of the time range. Preferably, the polymerization is conducted in the presence of actinic radiation, such as UV light.

Depending upon the nature of the polymer mixture, it may be desirable for the polymers obtained from such polymerizations to be post cured, e.g. at a somewhat elevated temperature such as between about 60° C. to about 150° C.

For the preparation of contact lenses, the polymer mixture may be cast directly in the shape of the lens, or the polymerization may be carried out in a mold having a shape convenient for further processing, such as in the shape of small cylinders or "buttons", which can then be machined.

Minor amounts i.e. less than 50%, preferably up to 30%, and most preferably up to no more than about 10% by weight, of conventional copolymerizible vinyl monomers other than hydrophilic modifiers, can be employed as extenders, or the like, in the preparation of the instant polymer, as copolymer constituents. However, if the total hydrophilic modifier content is within the foregoing limits, the hydrophilic modifiers can also be used as such extenders. Suitable vinyl monomers include:

acylates and methacrylates of the general formula

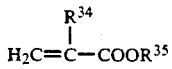

where $R^{34}$ is hydrogen or methyl and $R^{35}$ is a straight chain or branched aliphatic, cycloaliphatic or aromatic group having up to 20 carbon atoms which is unsubstituted or substituted by one or more alkoxy, alkanoyloxy or alkyl of up to 12 carbon atoms, or by halo, especially chloro or preferably fluoro, or $C_3$-$C_5$ polyalkyleneoxy of 2 to about 100 units;

acrylamides and methacrylamides of the general formula

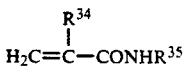

where $R^{34}$ and $R^{35}$ are defined above;
vinyl ethers of the formula

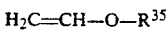

where $R^{35}$ is as defined above;
vinyl esters of the formula

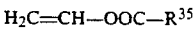

where $R^{35}$ is as defined above;

maleates and fumarates of the formula

where $R^{35}$ is as defined above;
and vinylic substituted hydrocarbons of the formula

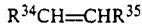

where $R^{34}$ and $R^{35}$ are as defined above.

Useful monomers include, for example:

methyl-, ethyl-, propyl-, isopropyl-, butyl-, ethoxyethyl-, methoxyethyl-, ethoxypropyl-, phenyl-, benzyl-, cyclohexyl-, hexafluoroisopropyl-, or n-octyl-acrylates and -methacrylates as well as the corresponding acrylamides and methacrylamides;

dimethylfumarate, dimethylmaleate, diethylfumarate, methyl vinyl ether, ethoxyethyl vinyl ether, vinyl acetate, vinyl propionate, vinyl benzoate, acrylonitrile, styrene, alphamethyl styrene, 1-hexene, vinyl chloride, vinyl methyl ketone, vinyl stearate, 2-hexene and 2-ethylhexyl methacrylate.

In one preferred aspect, the instant polymers are free from copolymer units of such conventional monomers which are not hydrophilic modifiers.

The vinylic monomers of formulae I-III can be prepared by methods known, per se.

For example, the siloxane/polyalkylene oxide containing divinylic macromers of formulae I-III may be prepared by reacting a siloxane diol of the formula HO—Sil—H, wherein Sil is a group of formula IV, (wherein $R^{14}$ is (—O—) with a sufficient amount of a difunctional reactive group containing compound at least one of which reactive groups is coreactive with OH, such as isocyanate; activated carboxy, such as an anhydride, an acid halide or a carboxy ester; or is a leaving group, such as a halide, sulfato or the like, to form the corresponding reactive group containing endcapped derivative. Such reactive compounds for forming preferred macromers include toluene diisocyanate, isophorone diisocyanate, and polyalkylene oxide mono- or di-capped by isocyanate.

The resulting endcapped siloxane derivative can then be reacted with a polyoxyalkylene diol of the formula HO—(A—H, wherein —A— is a group of formula V above to form the corresponding polyoxyalkylene—siloxane—polyoxyalkylene diol. This diol can be then reacted with a reactive end Cap group containing monomer wherein the reactive group is an isocyanate; activated carboxy, such as an anhydride, an acid halide or carboxy ester, or is a leaving group such as halo, sulfato or the like to form the corresponding di(-Cap) derivative. Alternatively, the aforementioned polyoxyalkylene—siloxane—polyoxyalkylene diols can be further sequentially reacted with a further difunctional reactive group containing compound having the group —L— to form the corresponding di-functional reactive endcapped derivative which is then reacted with a siloxane of the formula HO—Sil—H. One may continue building up alternative polyoxyalkylene/siloxane unit containing diols in this manner, as desired Then this may be endcapped with a reactive group containing vinylic monomer having a terminal 'Cap' moiety or reacted with a sufficient amount of difunctional reactive group containing compound to endcap the diol with a reactive group, such as eg. an isocyanate, etc. group which is then reacted with the appropriate 'Cap' containing compound, such as an vinylic amine or alcohol, or other copolymerizable monomer having a crosslinkable group to obtain the corresponding product of formula I.

Of course, instead of starting with a siloxane of the formula HO—Sil—H and building up the alternating sequence therefrom, one may instead begin with a polyoxyalkylene diol of the formula HO—(A—H and, after endcapping the same with difunctional reactive groups, condense the same with the siloxane until the desired number alternating siloxane/polyalkylene oxide groups is attained and terminate the diol with Cap groups as described above.

Alternative synthesis of the direactive siloxane can be accomplished for example with a siloxane dihydride of the formula

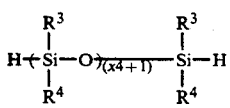

and reacting it (as known in the art) with a divinyl containing compound such as divinylbenzene to yield the dicapped siloxane, such as

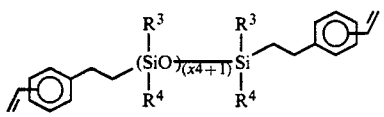

or

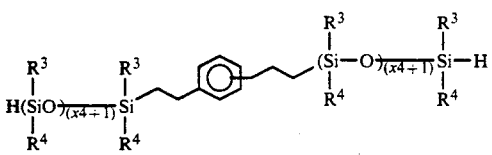

depending on stoichiometry. Each of these can be reacted with corresponding reactive group containing siloxanes to build the segment of formula IV. Additionally, especially if the divinyl capped siloxane contains a siloxane portion which is different than that in the disiloxane hydride capped diethylbenzene above, each of these can be reacted together to form a formula IV containing material. Once the formula IV containing portion has been built, it can be terminated by a reaction with a siloxane monohydride, typically hydroxy- or hydroxy reactive group containing siloxane hydride, if vinyl groups remain, or a vinyl containing and either hydroxy or hydroxy reactive group containing material if the last functionality is a silicone hydride. Once this step is reached, the reactive group capped siloxane may then be used in the same manner as the reactive endcapped HO—Sil—H indicated above and the hydroxy terminated material may be used as HO—Sil—H, indicated above.

Synthesis of the macromers may be accomplished neat or in solvents as indicated in the Examples attached hereto in accordance with known synthetic techniques.

The above reactive monomers are characteristically polymerized under conventional polymerization conditions with a hydrophilic modifier of formulae A-C or a mixture of a hydrophilic modifier of formulae A-C and a copolymerizable monomer. In those vinylic macromers containing but one vinyl group, a minor amount e.g. from about 0.01 to about 5 weight percent, based on the macromer of formula I-III, of a conventional crosslinking agent, may be employed. Suitable crosslinking agents include diolefinic monomers such as:

Allyl acrylate and methacrylate; alkylene glycol and polyalkylene glycol diacrylates and dimethacrylates, such as ethyleneglycol dimethacrylate, diethylene glycol dimethacrylate, and propylene glycol dimethacrylate; trimethylol propane triacrylate; pentaerythritol tetracrylate, divinylbenzene; divinyl ether; divinyl sulfone;

bisphenol A diacrylate or dimethacrylate; methylene bisacrylamide; diallyl phthalate; triallyl melamine and hexamethylene diacrylate and dimethacrylate. Also, such minor amounts of a crosslinking agent may be employed, if desired, in the polymerization of the mono or di-vinyl macromer of formula III.

When the macromers of formulae I-III have free hydroxy, isocyanato, carboxylic acid, or amine groups, suitable crosslinking agents contain di or poly functional co-reactive groups to form addition or condensation reactions linking 2 or more chains.

If desired, the macromer reaction mixture may contain a catalytic amount of a conventional catalyst, preferably a free radical catalyst. Of particular interest are conventional peroxide and azo catalysts, such as hydrogen peroxide, benzoyl peroxide, tert-butyl peroctoate, benzoyl peroxide or azobis (isobutrylnitrile).

The aforementioned reactions are generally straight forward additions or condensations and are typically conducted at a reaction temperature between about $-10°$ C. to about $100°$ C., depending upon the relative reactivity of the species involved, in the presence or absence of an inert diluent and in the optional presence of an addition or condensation catalyst if desired or appropriate. For reactions involving an isocyanate or acid halide, with a diol, for example, suitable optional catalysts include pyridine and triethylamine.

In the preparation of ophthalmic devices, such as contact lenses, the reaction mixture may be cast directly in the shape of the lens, or the polymerization may be carried out in a mold having a shape convenient for further processing, such as the shape of a small cylinder or "button", which can then be machined.

The siloxane of the formula HO—Sil—H are known in the art and many are commercially readily available.

Also, the polyoxyalkylene diols of the formula HO—A—H are known or can be prepared by known methods.

Thus, the polyols of the formula HO—A—H are generally prepared by the addition reaction of t moles of an epoxide of the formula

 (X)

where $R_7$-$R_8$, r and t are as defined above, optionally in the presence of a conventional alkylation catalyst, at atmospheric to elevated pressures of up to about 30 atmospheres gauge, at temperatures between $0°$ C. to about $130°$ C., optionally in the presence of an inert diluent. If desired, one may add to the reaction mixture, prior to the reaction of the epoxides, an aliphatic, aromatic or cycloaliphatic alcohol, acid or amine having up to 14 carbon atoms to prepare the corresponding mono-ols.

The reaction between the epoxides, when mixtures of different epoxides are employed to obtain the polyol of the formula HO—A—H, can be conducted by admixing the epoxides to obtain random copolymers or terpolymers, etc., or the addition can be conducted sequentially to form block copolymers having terminal hydroxy groups. Suitable catalysts include alkaline earth oxides, alkaline earth carbonates, alkyl zinc compounds, aluminum alkoxides, hydrates of ferric chloride, bromide and acetate, and gamma radiation. The reaction may also by initiated by the presence of a glycol, such as ethylene glycol or propylene glycol or by a polyol of higher functionality such as sucrose, or by an amine, such as ethylene diamine, toluenediamine, and so forth. Generally the length of time of the reaction will depend in part on the alkylene oxide employed, but can generally be from less than one to several score hours. Thus, ethylene oxide generally is about three times as active as propylene oxide, which in turn reacts more rapidly than 1,2-butylene oxide. The preparation of polyoxitanes and polytetrahydrofurans are generally initiated via ring opening oxonium formation using trialkyloxonium salts, carboxonium salts, acylium salts and the like.

Suitable diols of the formula HO—A—H include those prepared from epoxides such as:

1,2-propylene oxide; 1,2-butylene oxide; 1,2-epoxydecane; 1,2-epoxydodecane; 1,2-epoxyoctane; 2,3-epoxynorbornane; 1,2-epoxy-3-ethoxypropane; 1,2-epoxy-3-phenoxypropane; 2,3-epoxypropyl 4-methoxyphenyl ether; tetrahydrofuran; 1,2-epoxy-3-cyclohexyloxypropane; oxetane; 1,2-epoxy-5-hexene; 1,2-epoxyethylbenzene; 1,2-epoxy-1 methoxy-2-methylpropane; perfluorohexylethoxypropylene oxide; benzyloxypropylene oxide; and the like. Also, the aforementioned epoxides may be employed as mixtures thereof. Further, certain cyclic ethers of formula IX, r is 3 and the carbocyclic portion of the ring is substituted are resistant to polymerization alone, copolymerize quite readily with more reactive cyclic ethers. Suitable co-monomers include, for example, 2-methyl-tetrahydrofuran and 3-methyl-tetrahydrofuran. Also, while ethylene oxide may be employed as a co-monomer, ethylene oxide polymers, in the absence of more hydrophobic units, is characteristically too hydrophilic and absorbs too much aqueous fluid to be of use in accordance with the instant invention. However, ethylene oxide/propylene oxide copolymeric diols wherein there is 30-80%, preferably greater than 50% more preferably greater than 66%, propylene oxide, on a mole basis is sufficiently hydrophobic so as to be substantially non-swellable in aqueous media, and yet sufficiently hydrophilic so as to exhibit a contact angle with water of less than 60°, preferably less than 40°, more preferably less than 25°, still more preferably less than 15°, most preferably less than 10°.

Many polymer diols of the formula HO—A—H are commercially available. Thus, suitable diol products include poloxamers having the general formula HO(CH$_2$CH$_2$O)$_{(t1)}$(CH(CH$_3$)CH$_2$O)$_{(t2)}$(CH$_2$CH$_2$O)$_{(t3)}$H wherein t$_2$ has a value between about 16 and 100 and the sum such poloxamers, and their average values of t$_1$, t$_2$ and t$_3$, include poloxamer 101 (t$_1$ is 2, t$_2$ is 16, t$_3$ is 2); poloxamer 122 (t$_1$ is 5, t$_2$ is 21, t$_3$ is 5); poloxamer 181 (t$_1$ is 3, t$_2$ is 30, t$_3$ is 3); poloxamer 212 (t$_1$ is 8, t$_2$ is 35, t$_3$ is 8); poloxamer 231 (t$_1$ is 6, t$_2$ is 39, t$_3$ is 6); poloxamer 282 (t$_1$ is 10, t$_2$ is 47, t$_3$ is 10); poloxamer 331 (t$_1$ is 7, t$_2$ is 54, t$_3$ is 7); poloxamer 401 (t$_1$ is 6, t$_2$ is 67, t$_3$ is 6).

Such poloxamers are available, eg. from BASF Wyandotte under their Pluronic ® brand name. Also suitable are the "reverse poloxamers", having polyethylene glycol bounded on each side by polypropylene glycol.

Polypropylene ether glycols include commercially available products having a molecular weight range between about 400 to about 4,000.

Linear siloxanes within formula IV$^1$ can be prepared as follows (Y3+1) moles of

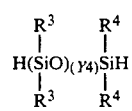

added to (Y3) moles of

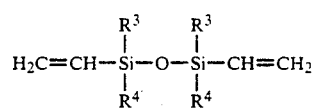

in the presence of Speier's catalyst yields

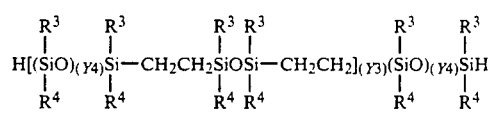

Y3 and Y4 are integers, but otherwise irrelevant. Modifications thereof to obtain specific monomers of formula IV are well known in the art. Of the above, when Y4 is 11, Y3 is 2 and each R is methyl, the resulting monomer is commercially available. Another commercially available monomer is

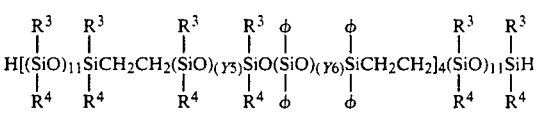

wherein each R is methyl and each $\phi$ is phenyl which is the result of reacting 5 moles of

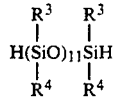

with 4 moles of

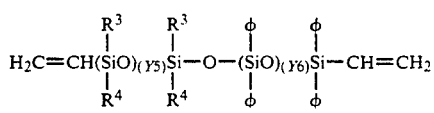

wherein [(Y5)+1] is 83-85% and [(Y6)+1]is 17-15% of the silicon atoms in the divinyl siloxane.

Monomers of formula V can be readily prepared as follows:

Beginning with a siloxane of the formula

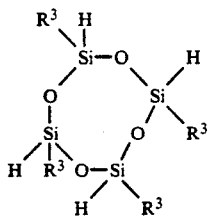

in which $R^3$ is methyl or phenyl, one reacts 1 mole of this compound with 2 moles of a styrene in the presence of Speier's catalyst to obtain replacement of two hydrogens with phenethyl groups, i.e. the compound of the formula

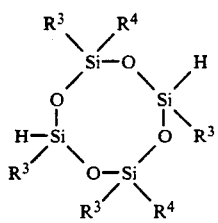

$R^4$ being phenethyl. These compounds can then be reacted with 2 moles of a divinyl benzene in the presence of Speier's catalyst to replace the two remaining hydrogens (on the silicon atoms) with 2-(p-styryl)ethyl groups. This distyryl terminated group can then be used to link other siloxane hydrides or copolymerize with other copolymerizable groups, especially vinyl monomers. Groups other than phenethyl for $R^4$ can be introduced by means known in the art. The compounds of siloxane rings of six ring members can be prepared analogously.

The 6 and 8 membered tri and tetrahydride siloxanes are readily available commercially or their preparation is well known in the art.

As stated above, the polymers for use in the instant invention are those which exhibit a receding contact angle at 20° C. of less than 60°, preferably less than 40°, more preferably less than 25°, more preferably less than 15° and most preferably less than 10°. The measurement of such contact angle is conveniently performed using a modified "Wilhelmy Plate" technique, as described, for example, for J. D. Androde, et al. *Surface and Interfacial Aspects of Biomedical Polymers*, Vol. 1, *Surface Chemistry and Physics*, Plenum Press, 1985, wherein a specimen sample in the form of a plate of known dimensions is immersed into the wetting solution, pure water, at a slow controlled rate, eg. at 2-20 mm per minute.

As mentioned above, the instant polymers for use in the present invention possess a high degree of oxygen permeability. The oxygen permeability, $DK(\times 10^{-10}$ mm. $ccO_2/cm.^2sec.mmHg)$, is measured using a modification of ASTM standard D3985-81 in that (a) there is used 21% oxygen, i.e. air, instead of 99-100% oxygen, (b) the surface area of sample employed is 0.50 square meters versus 100 square meters and the humidity is controlled to be at 95-100% relative humidity instead of 0% relative humidity.

Typically, conventional fully swollen polyhydroxyethyl methacrylate lenses which are sparingly crosslinked possess a $Dk(\times 10^{-10}$ mm. $ccO_2/cm.^2sec.mmHg)$ value of about 5-7.

The oxygen permeability of the instant polymers for use as an ophthalmic device, such as a contact lens, advantageously possess a $Dk(\times 10^{-10}$ mm. $ccO_2/cm.^2sec.mmHg)$ value generally greater than 7-10, preferably greater than about 15, more preferably greater than about 20, still more preferably greater than about 40, yet more preferably greater than 80, even more preferably greater than 100, most preferably at least 150.

The following examples are for illustrative purposes and are not to be construed as limiting the invention. All parts are by weight unless otherwise specified.

EXAMPLES 1-2

Hydrophilic Precursor Preparation

Using the following procedure, Examples 1 and 2 were prepared with the components outlined in Table I. To a 500 mL, 3-necked flask fitted with a constant pressure dropping funnel, condenser and nitrogen inlet and outlet adapters were charged all the styrene isocyanate, catalyst and 80 percent of methylene chloride. To the dropping funnel was added all the diol and 20 percent of the methylene chloride. The reaction system was sealed under nitrogen atmosphere, stirred magnetically and the contents of the dropping funnel added dropwise. After 18 hours the reaction was monitored via FT-infrared spectroscopy to insure that all the isocyanate band disappeared. Syntheses and analyses data for each Example are shown in Tables I and II.

TABLE I

| | Synthesis Information for Examples 1 and 2 | | | |
|---|---|---|---|---|
| Example | Diol. gm | Styrene Isocyante | Stannous Octoate | Methylene Chloride |
| 1 | Poly(propylene glycol 425), 70.54 | 49.64 gm | .64 gm | 150 mL |
| 2 | Poly(propylene glycol 725), 108.07 | 43.53 gm | .79 gm | 150 mL |

TABLE II

| | Analytical Data for Examples 1 and 2 | | | |
|---|---|---|---|---|
| Example | GPC MWN | GPC MWW | GPC Polydispersity | Visual Appearance |
| 1 | 885 | 913 | 1.032 | Clear/faint yellow tint |
| 2 | 1350 | 1395 | 1.034 | Clear/faint yellow tint |

EXAMPLE 3

Silicon Block Copolymer Synthesis

To a 250 ml, 3-necked flask equipped with a condenser, constant pressure dropping funnel and nitrogen inlet and outlet adapters were added 36.30 gm, 0.051 moles styryl capped poly(propylene glycol) precursor (Example 1) and 100 mL methylene chloride. The mixture was stirred magnetically, heated to 39° C. and 21.43 gm, 0.024 moles of

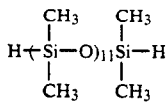

mixed with 0.65 gm Speier's catalyst and 30 mL methylene chloride were added dropwise via the dropping funnel under nitrogen atmosphere. After 24 hours, FT-infrared spectroscopy indicated the hydride band had disappeared. The reaction product was diluted with 100 ml methylene chloride, charged with sodium carbonate and carbon black, stirred 2 hours, filtered twice and the solvent removed via rotary evaporation. The product was clear, viscous fluid.

EXAMPLES 4-17

Formulations of the silicone block copolymer described in Example 3 were prepared with various concentrations of styrene, methylmethacrylate (MMA), divinylbenzene (DVS), ethylene glycol dimethacrylate (HEMA) and N-vinylpyrrolidone (NVP). 2% 2-hydroxy-2-methyl-2-methyl-1-phenyl-propan-1-one was added to each formulation with MMA and 0.2% Vazo 52 (Dupont) was added to each formulation with styrene. The formulations were stirred and protected from light until the bubbles caused by stirring escaped. The MMA formulations were transferred to polypropylene molds and cured four hours in ultra-violet light. The styrene formulations were transferred to polypropylene molds and cured thermally (65° C.) for 24 hours. Each formulation composition, shore D and clarity are shown in Table III. Note the formulations are given as weight percentages.

EXAMPLE 18

Silicone Block Copolymer Synthesis

To a 250 ml, 3-necked flask equipped with a condenser, constant pressure dropping funnel and nitrogen inlet and outlet adapters were added 45.70 gm, 0.024 moles styryl capped poly(propylene glycol) precursor (Example 2) and 100 mL methylene chloride. The mixture was stirred magnetically, heated to 39° C. and 18.69 gm, 0.021 moles of a hydride terminated silicone mixed with 0.65 gm Speier's catalyst and 30 mL methylene chloride were added dropwise via the dropping funnel under nitrogen atmosphere. After 24 hours, FT-infrared spectroscopy indicated the hydride band had disappeared. The reaction product was diluted with 100 ml methylene chloride, charged with sodium carbonate and carbon black, stirred 2 hours, filtered twice and the solvent removed via rotary evaporation. The product was clear, viscous fluid.

TABLE III

| | | | | | | | | | Physical Data | |
|---|---|---|---|---|---|---|---|---|---|---|
| Example | Silicone Block Copolymer | Styrene | MMA | DVB | EGDMA | DMA | HEMA | NVP | Shore D | Clarity |
| 4 | 20 | 72.8 | — | 2 | — | 5 | — | — | 74 | Opaque |
| 5 | 30 | 62.8 | — | 2 | — | 5 | — | — | 70 | Hazy |
| 6 | 40 | 52.8 | — | 2 | — | 5 | — | — | 65 | Hazy |
| 7 | 20 | — | 72.8 | — | 2 | 5 | — | — | 85 | Clear |
| 8 | 30 | — | 62.8 | — | 2 | 5 | — | — | 83 | Clear |
| 9 | 40 | — | 52.8 | — | 2 | 5 | — | — | 79 | Clear |
| 10 | 30 | 62.8 | — | — | 2 | 5 | — | — | 73 | Hazy |
| 11 | 30 | 62.8 | — | — | 2 | — | 5 | — | 65 | Hazy |
| 12 | 30 | 62.8 | — | — | 2 | — | — | 5 | 45 | Hazy |
| 13 | 30 | — | 62.8 | 2 | — | 5 | — | — | 81 | Clear |
| 14 | 30 | — | 62.8 | 2 | — | — | 5 | — | 83 | Clear |
| 15 | 30 | — | 62.8 | 2 | — | — | — | 5 | 83 | Clear |
| 16 | 30 | 69.8 | — | — | — | — | — | — | 55 | Hazy |
| 17 | 30 | — | 69.8 | — | — | — | — | — | 83 | Clear |

EXAMPLES 19-32

Formulations of the silicone block copolymer described in Example 18 were prepared with various concentrations of styrene, methylmethacrylate (MMA), divinylbenzene (DVB), ethylene glycol dimethacrylate (EGDMA), N,N-dimethacrylamide (DMA), 2-hydroxyethyl methacrylate (HEMA) and N-vinylpyrrolidone (NVP). 0.2% 2-hydroxy-2-methyl-1-phenyl-propan-1-one was added to each formulation with MMA and 0.2% Vazo 52 (Dupont) was added to each formulation with styrene. The formulations were stirred and protected from light until the bubbles caused by stirring escaped. The MMA formulations were transferred to polypropylene molds and cured four hours in ultra-violet light. The styrene formulations were transferred to polypropylene molds and cured thermally (65° C.) for 24 hours. Each formulation composition, shore D and clarity are shown in Table IV. Note the formulations are given as weight percentages.

TABLE IV

| | | | | | | | | | Physical Data | |
|---|---|---|---|---|---|---|---|---|---|---|
| Example | Silicone Block Copolymer | Styrene | MMA | DVB | EGDMA | DMA | HEMA | NVP | Shore D | Clarity |
| 19 | 20 | 72.8 | — | 2 | — | 5 | — | — | 55 | Opaque |
| 20 | 30 | 62.8 | — | 2 | — | 5 | — | — | 60 | Hazy |
| 21 | 40 | 52.8 | — | 2 | — | 5 | — | — | 55 | Hazy |
| 22 | 20 | — | 72.8 | — | 2 | 5 | — | — | 87 | Clear |
| 23 | 30 | — | 62.8 | — | 2 | 5 | — | — | 85 | Clear |
| 24 | 40 | — | 52.8 | — | 2 | 5 | — | — | 83 | Clear |

TABLE IV-continued

| | | | | | Physical Data | | | | | |
| Example | Silicone Block Copolymer | Styrene | MMA | DVB | EGDMA | DMA | HEMA | NVP | Shore D | Clarity |
| --- | --- | --- | --- | --- | --- | --- | --- | --- | --- | --- |
| 25 | 30 | 62.8 | — | — | 2 | 5 | — | — | 62 | Hazy |
| 26 | 30 | 62.8 | — | — | 2 | — | 5 | — | 65 | Hazy |
| 27 | 30 | 62.8 | — | — | 2 | — | — | 5 | 15 | Hazy |
| 28 | 30 | — | 62.8 | 2 | — | 5 | — | — | 82 | Clear |
| 29 | 30 | — | 62.8 | 2 | — | — | 5 | — | 83 | Clear |
| 30 | 30 | — | 62.8 | 2 | — | — | — | 5 | 83 | Clear |
| 31 | 30 | 69.8 | — | — | — | — | — | — | 5 | Hazy |
| 32 | 30 | — | 69.8 | — | — | — | — | — | 83 | Clear |

We claim:

1. A macromer comprising a segment, Seg, of the formula $$-R^{14}-Sil-[(L)_h-R^{14}-Sil]_n(L)_h-R^{15}-A-L-R^{1-5}-A]_m \quad (I)$$

wherein $R^{14}$ is a bond or $-N(R^1)-$, or $-O-$, provided that it may not be an oxygen if it is attached directly to a silicon atom or another oxygen atom, and may not be $-N(R^1)-$ if $R^{14}$ is attached directly to an oxygen atom or to a nitrogen atom;

$R^{15}$ is $-O-$ or $-N(R^1)-$;

$R^1$ is H, $C_{1-4}$alkyl, or phenyl;

n is 0-3;

m is 0-3;

h is 1, or h may be 0 when the atom of Sil to which it would otherwise be attached is carbon;

each Sil is independently of the formula

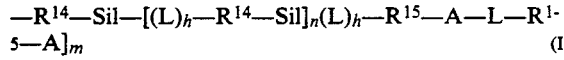

wherein (x1) and (x3) are independently an integer of from 0 to 25;

(x2) is an integer of from 1 to 25;

each (Sil²), (Sil³), (Sil⁴), and (Sil⁵) is independently selected from cyclic siloxanes of the formula (IV²)

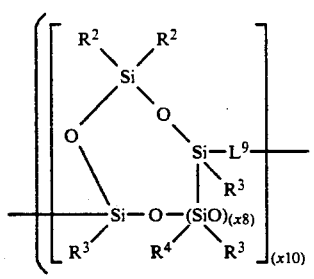

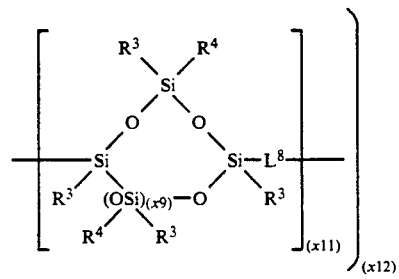

provided that Sil² is not the same as Sil³, Sil⁵ is not the same as Sil⁴, and Sil³ and Sil⁴ are the same or different;

in which each $R^3$ may be the same or different;

each $R^4$ may be the same or different;

each of (x10) is independently zero to 25;

each of x11, and x12 is independently 1 to 25;

each or x8 and x9 is independently zero or one;

each $R^3$ and $R^4$ is independently selected from a) $C_{1-18}$ alkyl or aryl of up to 12 carbon atoms, each of which is unsubstituted or substituted by halogen or by $C_{1-4}$alkyl, b) halogen; or c) a group of the formula

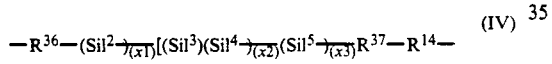

wherein (x13) is an integer of from 1 to 3; each $R^{38}$ may be the same or different and is selected from $C_{1-4}$alkyl,

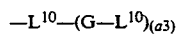

or $C_{6-12}$aryl, with each $R^{39}$ and each $R^{40}$ being independently selected from $C_{1-4}$alkyl, $C_{6-12}$aryl, epoxy, halogen, hydroxy $C_{1-4}$alkyl, amino, amino-$C_{1-4}$alkyl, hydroxy, isocyanto, or isothiocyanato;

each $L^8$, and each $L^9$ is, when linking two Si atoms, independently a linking group of the formula $$-L^{10}-(G-L^{10})_{(a3)} \quad (XII)$$

wherein a3 is zero or one;

each $L^{10}$ is independently selected from

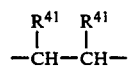

or $-O-$ when (a3) is zero or one or further selected from $-OC-(O)-$ and $-OC(O)NR-$ when (a3) is one, and in which the atom of $L^{10}$ bonded to a silicon atom is either a saturated carbon atom or an oxygen atom;

each $R^{41}$ is independently hydrogen or lower alkyl; and when not linking 2 silicon atoms, and $L^8$ is independently further selected from a linking group of the formula $$-L^{10}-(G-L^{11})_{(a4)} \quad \text{(XIII)}$$

wherein (a4) is zero or one;
$L^{10}$, when (a4) is zero or one, is selected from

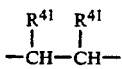

or oxygen;
and when (a4) is one, $L^{10}$ is further selected from —OC(O)— or OC(O)NR$^1$—, in which the atom of $L^{10}$ which is bound to a silicon atom is either a saturated carbon or an oxygen;
$L^{11}$ is selected from a bond,

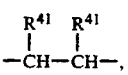

—O—, —C(O)—, —OC(O)—, —C(O)O—, —OC(O)O—, —NR$^1$—C(O)—, —C(O)NR$^1$—, —OC(O)NR$^1$—, —NR$^1$C(O)O—, or —NR$^1$C(O)NR$^1$—,
$R^{41}$ and $R^1$ being as defined above;
G is a linking group selected from
a) a divalent aliphatic group having up to 25 carbon atoms, which may be interrupted by an interrupting unit selected from —O—, —COO—, —OOC—, —NR1—, —NR$^1$CO—, OCNR$^1$—, —OOCNR$^1$—, —NR$^1$COO—, —OOCO—, or —NR$^1$C(O)NR$^1$—; each of said divalent aliphatic groups whether interrupted or not being unsubstituted or substituted by lower alkyl;
b) a divalent 5–7 membered cycloaliphatic,,a divalent 5–7 membered cycloaliphatic-C$_{1-18}$aliphatic, and a divalent C$_{1-18}$aliphatic-5–7 membered cycloaliphatic-C$_{1-18}$-aliphatic, each of which may be interrupted in the non-cyclic portion or between the cyclic and non-cyclic portion as in a) above or be unsubstituted or substituted as in a) above, or both interrupted and substituted as in a) above;
c) a divalent C$_{6-25}$arylene which is unsubstituted or substituted by a subsituent selected from halogen, C$_{1-4}$alkyl, C$_{1-12}$perhaloalkyl, amino, carboxy, C$_{1-4}$alkoxy carbonyl, amino carbonyl, C$_{1-4}$alkylamino carbonyl di(C$_{1-4}$-alkyl) amino carbonyl, or a polyglycol of the formula

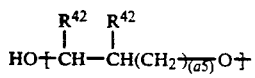

wherein (a5) is zero or one;
one of $R^{42}$ and $R^{43}$ is H and the other is hydrogen or methyl when (a5) is zero and both $R^{42}$ and $R^{43}$ are hydrogen when (a5) is one; and (a6) is an integer of up to 60; or
d) a divalent -(aliphatiyl)$_{(a7)}$- aryl(aliphatyl)$_{(a8)}$- wherein one of (a7) and (a8) is one and the other is independently zero or 1, each aliphatyl having up to 40 carbon atoms, the aryl portion being 6–14 carbon atoms, the aliphatyl portions being uninterrupted or interrupted as in a) above, the (aliphatyl)-$_{(a7)}$ aryl-(aliphatyl)$_{(a8)}$ group further being uninterrupted or interrupted between either or both of the aliphatyl portions and the aryl portions by an interrupting group set out in a) above, the aliphatyl portions being independently unsubstituted or substituted by a substituent set forth in a) above, and the aryl portion being unsubstituted or substituted by a substituent set forth in c) above;
each $R^{36}$ and each $R^{37}$ is independently selected from a bond, or the same group from which $L^8$ is selected;
each L is independently of the formula
each A is independently of the formula $$-L^1R^6L^2-$$

and
each A is independently of the formula

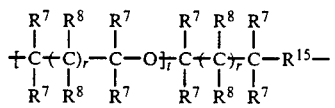

and within formula IV:
each $R^2$ and each $R^5$ are independently C$_{1-7}$alkylene, carbonyl, C$_{1-6}$alkylene carbonyl, C$_{1-4}$alkylene-(oxy-C$_{1-4}$-alkylene)$_g$ or C$_{1-4}$alkylene—OCH$_2$-(hydroxy C$_{1-4}$alkylene)-CH$_2$; and
with g being an integer of from 1 to 10;
each y is independently 1 to 200;
and each $R^3$ and each $R^4$ is independently selected from C$_{1-18}$alkyl or aryl of up to 12 carbon atoms;
and within L:
each $L^1$ and each $L^2$ is independently

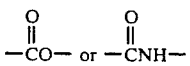

in which the oxygen or nitrogen is bound to $R^6$, or

or a bond; and
each $R^6$ is independently
(i) —(C$_{1-25}$aliphatic)—
(ii) of the formula $$-(C_{1-20}\text{aliphatic})_j-Q_k-[(5-7 \text{ membered cycloaliphatic or} \quad \text{(IX)}$$
$$\text{aryl of up to 25 carbon atoms})-Q_{(k1)}-(C_{1-20}\text{aliphatic})_{(j1)}]_D$$

in which
each q is independently 0–3;
each j, each k, each (j$_1$) and each (k$_1$) and each d is independently 0 or 1 but if j is 0, k is 0 and if (j$_1$) is 0, (k$_1$) is 0;
each D is 1 to 3;
each aliphatic group in the $R^6$ (i) or (ii) above is uninterrupted or interrupted at any point by Q;
each aliphatic, cycloaliphatic, and aryl group within the $R^6$ (i) or (ii) above is unsubstituted or substituted by one or more substituents which substituents are halogen, hydroxy, C$_{1-4}$alkyl, carboxy or C$_{1-12}$perhaloalkyl;
each Q is independently selected from —O—,

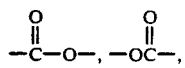

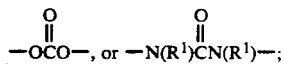

and within formula V:
each r is independently 0–4;
each t is independently 3–200; and
each $R^7$ is independently selected from groups i) or iii) below and each $R^8$ is independently selected from groups i)–iv) below:

i) hydrogen, halogen, unsubstituted $C_{1-16}$alkyl, substituted $C_{1-16}$alkyl, unsubstituted $C_{2-16}$alkenyl, or substituted $C_{2-16}$alkenyl, wherein a) the substituents on the alkyl and alkenyl groups in i) are independently selected from fluoro, $C_{1-16}$alkoxy, $C_{2-16}$alkanoyloxy, $C_{1-16}$alkoxy-C(O)-$C_{2-16}$alkenyloxy-C(O)-, $C_{3-16}$alkenoyloxy, aryl of up to 10 carbon atoms, aryloxy of up to 10 carbon atoms, aroyl of up to 11 carbon atoms, aroyloxy of up to 11 carbon atoms, aryl (of up to 10 carbon atoms)-oxycarbonyl, $C_{3-8}$cycloalkyl, $C_{3-8}$cycloalkoxy, ($C_{3-8}$cycloalkyl)-carbonyloxy, ($C_{3-8}$cycloalkoxy)carbonyl, oxacycloalkyl of up to 7 carbon atoms, oxacycloalkoxy of up to 7 carbon atoms, oxacycloalkoxy (of up to 7 carbon atoms)-carbonyl, and oxacycloalkyl (of up to 7 carbon atoms)-carbonyloxy; and b) each alkyl or alkenyl group in a) being unsubstituted or further substituted by fluoro, $C_{1-6}$alkyl, or $C_{1-6}$alkoxy provide that said last mentioned alkoxy is not bound to a carbon already singly bound to another oxygen atom;

ii) $C_{1-16}$alkoxy, $C_{2-16}$alkanoyloxy, $C_{1-16}$alkoxy—C(O)—, $C_{2-16}$alkenyloxy—C(O)— and $C_{3-16}$alkenoyloxy, each of which may be further substituted by fluoro, aryl of up to 10 carbon atoms, or $C_{1-6}$alkoxy provided that the last mentioned alkoxy is not bound to a carbon atom which is singly bound to another oxygen;

iii) aryl of up to 10 carbon atoms, $C_{3-8}$cycloalkyl, and oxacycloalkyl of up to 7 carbon atoms, each of which is unsubstituted or substituted by a substituent selected from those indicated in i)a) or b) above; or iv) aryloxy of up to 10 carbon atoms, cycloalkoxy of up to 8 carbons, cycloalkyl (of up to 8 carbons)—C(O)O—, cycloalkoxy (of up to 8 carbons)-carbonyl, aroyloxy of up to 11 carbons, oxacycloalkoxy of up to 7 carbons, oxacycloalkenyloxy of up to 7 carbons, oxacycloalkoxy (of up to 7 carbon atoms)-carbonyl, oxacycloalkyl (of up to 7 carbon atoms)-carbonyloxy, aryloxy of up to 11 carbon atoms, and aroyloxy of up to 11 carbon atoms, each of which is unsubstituted or substituted by fluoro, $C_{1-6}$alkyl, or $C_{1-6}$alkoxy, provided said last mentioned alkoxy is not bound to a carbon atom which is singly bound to another oxygen; and 2 adjacent groups $R^7$ and $R^8$, together with the atoms to which they are attached may define a 5–8 membered cycloalkyl, cycloalkenyl, or oxacycloalkyl ring or a 6–14 membered bicyclo-ring.

2. The macromer of claim 1 comprising a segment, Seg, in a group, Grp, of the formula

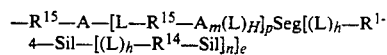

wherein $R^{14}$, $R^{15}$, L, Seg, Sil, h and A are as defined in claim 1;
m is an integer of 0–10;
n is an integer of 0–3;
p is an integer of 0–7; and
a and e are each 0 or 1, but a+e=1.

3. The macromer of claim 2 of the formula

    II wherein
Grp is as defined in claim 2;
each Cap is independently selected from formula VI or VII below provided at least one Cap per macromer is of formula VI; wherein formula VI is

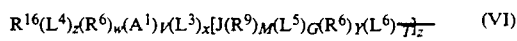    (VI)

and formula VII is

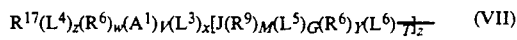    (VII)

in which
each $R^6$ is as defined in claim 2;
each w, x and z are independently 0 or 1, but if w is 0, then one of x and z must be 0;
each G, M, T, V, Y and Z is independently 0 or 1, but if Y is 0, then G must be zero and M must be one;
each J is —O— or —NH—;
each $A^1$ and $R^9$ is independently of the formula

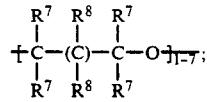

each $L^3$ is independently

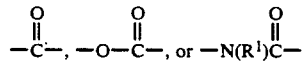

with the right hand portion attached to Grp provided that the atom of Grp to which $L^3$ is attached is not a carbonyl carbon an amido nitrogen or a carboxy oxygen and $L^3$ is —O— or —$NR^1$— when the atom of Grp to which it is attached is a carbonyl carbon;
each $L^4$ is independently

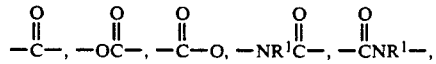

when w is one, and selected from the same group as $L^3$ when w is zero;
each $L^5$ is

with the carbonyl attached to $R^9$ or J;
each $L^6$ is

with the nitrogen attached to $R^6$ or $R^9$;
each $R^{16}$ is independently of the formula

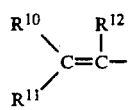 (VIII)

in which $R^{12}$ is hydrogen or $C_{1-7}$alkyl and each of $R^{10}$ and $R^{11}$ is independently H, $C_{1-7}$alkyl, or —$COOR^{13}$ with $R^{13}$ being H or $C_{1-4}$ alkyl;
and $R^{17}$ is selected from
a) H, $NH_2$, OH, —NCO, —NCS,

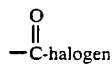

or $COOR^{12}$ when the non-$R^{17}$ atom to which it is attached is a non-carbonyl saturated carbon or the non-$R^{17}$ atom to which it is attached is a carbon which is part of a ring;
b) H,

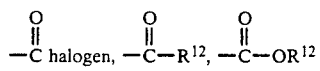

or $R^{12}$ when the non-$R^{17}$ atom to which it is attached is an oxygen other than a carboxy oxygen;
c) H or $R^{12}$, when the non-$R^{17}$ atom to which it is attached is a carboxy oxygen;
d)

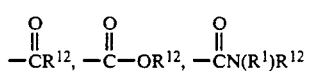

or $R^{12}$ when the non-$R^{17}$ atom to which it is attached is an amino nitrogen, or $R^{12}$ when the non-$R^{17}$ atom to which it is attached is an amido nitrogen;
e) OH, $R^{12}$,

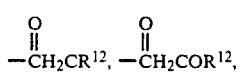

$NH_2$ or —$NHR^{12}$ when the non-$R^{17}$ atom to which it is attached is a carboxy carbon; or
f) H, OH, hal or —$OR^{12}$ when the non-$R^{17}$ atom to which it is attached is silicon.

* * * * *